(12) United States Patent
Ono et al.

(10) Patent No.: US 7,484,897 B2
(45) Date of Patent: Feb. 3, 2009

(54) OPTICAL MODULE, OPTICAL MODULE SUBSTRATE AND OPTICAL COUPLING STRUCTURE

(75) Inventors: Masaki Ono, Aichi (JP); Toshikatsu Takada, Aichi (JP); Toshifumi Kojima, Aichi (JP); Takeshi Ohno, Aichi (JP); Susumu Wakamatsu, Gifu (JP); Toshikazu Horio, Aichi (JP); Ayako Kawamura, Nagoya (JP)

(73) Assignee: NGK Spark Plug Co., Ltd., Aichi (JP)

( * ) Notice: Subject to any disclaimer, the term of this patent is extended or adjusted under 35 U.S.C. 154(b) by 0 days.

(21) Appl. No.: 11/932,565

(22) Filed: Oct. 31, 2007

(65) Prior Publication Data
US 2008/0063342 A1    Mar. 13, 2008

Related U.S. Application Data

(62) Division of application No. 11/138,426, filed on May 27, 2005, now Pat. No. 7,404,680.

(30) Foreign Application Priority Data

May 31, 2004 (JP) ............... 2004-162244
Aug. 27, 2004 (JP) ............... 2004-248486

(51) Int. Cl.
G02B 6/36 (2006.01)
(52) U.S. Cl. ............... 385/53; 385/14; 385/49; 385/50; 385/51; 385/52; 385/54; 385/55; 385/56; 385/83; 385/85; 385/86; 385/87; 385/88; 385/89; 385/90; 385/91; 385/92; 385/93; 385/94; 439/577
(58) Field of Classification Search ............. 385/88–94, 385/14, 49–56, 83, 85; 439/577
See application file for complete search history.

(56) References Cited

U.S. PATENT DOCUMENTS

| | | | |
|---|---|---|---|
| 4,998,159 A | * | 3/1991 | Shinohara et al. ........... 361/809 |
| 5,043,223 A | | 8/1991 | Kumagai et al. |
| 5,574,814 A | * | 11/1996 | Noddings et al. ............. 385/90 |
| 6,048,106 A | | 4/2000 | Iwase |

(Continued)

FOREIGN PATENT DOCUMENTS

CN    1154745 A    7/1997

(Continued)

OTHER PUBLICATIONS

International Standards IEC 60874-16, 1994, 37 pages.

(Continued)

*Primary Examiner*—Brian Healy
*Assistant Examiner*—Guy G Anderson
(74) *Attorney, Agent, or Firm*—Sughrue Mion, PLLC

(57) ABSTRACT

There is provided an optical module for coupling with a fiber optic cable through an optical connector, including a module body connectable with a plug of the optical connector by a dedicated guide pin, with a side surface of the module body being opposed to a mating surface of the connector plug at which an end face of the fiber optic cable is exposed, and an optical element mounted to the module body and having an optical axis brought into alignment with an optical axis of the fiber optic cable upon fitting of the guide pin into the module body and the connector plug.

11 Claims, 15 Drawing Sheets

U.S. PATENT DOCUMENTS

| | | |
|---|---|---|
| 6,203,212 B1 | 3/2001 | Rosenberg et al. |
| 6,318,902 B1 | 11/2001 | Igl et al. |
| 6,318,909 B1 | 11/2001 | Giboney et al. |
| 6,459,843 B1 | 10/2002 | Igl et al. |
| 6,739,760 B2 * | 5/2004 | Cheng et al. .................. 385/89 |
| 6,741,776 B2 * | 5/2004 | Iwashita et al. ............... 385/49 |
| 6,741,778 B1 | 5/2004 | Chan et al. |
| 6,759,740 B2 | 7/2004 | Onitani et al. |
| 6,775,440 B2 | 8/2004 | Kishida et al. |
| 6,860,650 B2 * | 3/2005 | Kunkel et al. .................. 385/92 |
| 6,960,031 B2 | 11/2005 | McFarland et al. |
| 2002/0114587 A1 | 8/2002 | Golwalkar et al. |
| 2003/0007717 A1 | 1/2003 | Chiappetta et al. |
| 2003/0034438 A1 | 2/2003 | Sherrer et al. |
| 2003/0068153 A1 | 4/2003 | Suzuki |
| 2003/0138223 A1 | 7/2003 | Sasaki et al. |
| 2003/0142922 A1 * | 7/2003 | Dallas et al. .................. 385/83 |
| 2004/0184737 A1 | 9/2004 | Oono et al. |

FOREIGN PATENT DOCUMENTS

| | | |
|---|---|---|
| DE | 199 17 554 A1 | 11/2000 |
| EP | 1 028 337 A2 | 8/2000 |
| JP | 8-250542 A | 9/1996 |
| JP | 9-222538 | 8/1997 |
| JP | 2000-249883 | 9/2000 |
| JP | 2000304966 | 11/2000 |
| JP | 2001-4880 | 1/2001 |
| JP | 2001-116962 | 4/2001 |
| JP | 2002-170965 A | 6/2002 |
| JP | 2002-236228 A | 8/2002 |
| JP | 2002-359472 | 12/2002 |
| JP | 2003-107283 | 4/2003 |
| JP | 2003-107283 A | 4/2003 |
| JP | 2003-207694 A | 7/2003 |
| JP | 2003-232963 | 8/2003 |
| JP | 2004-31743 A | 1/2004 |

OTHER PUBLICATIONS

"Abstract of the Fifth Forum on Electronic SI Research", Feb. 26, 2004, 3 pages.

T. Ohta, et al., "Two Dimensional Array MT Connector", Fujikura Technical Review No. 97, Oct. 1999, pp. 22-27.

* cited by examiner

OPTICAL MODULE, OPTICAL MODULE SUBSTRATE AND OPTICAL COUPLING STRUCTURE

CROSS-REFERENCE TO RELATED APPLICATION

This is a Divisional of Application Ser. No. 11/138,426 filed May 27, 2005, now U.S. Pat. No. 7,404,680, the above-noted application incorporated herein by reference in its entirety.

BACKGROUND OF THE INVENTION

The present invention relates to optical modules having photoelectric conversion functions to conduct optical communications. The present invention also relates to substrates for such optical modules as well as an optical coupling structure.

In response to the recent development of information and communication technologies (including the Internet) and the recent dramatic performance improvement of information processing equipment, there has been a growing need to transmit and receive a large capacity of data e.g. graphical data or video data. In order to carry out large-capacity data communications without restraint via an information network system, it is desirable that the information network system has a data transmission speed of several Gbps or higher. Optical communication technologies are expected to be especially useful to achieve such a high-speed data communication environment. There has also been a growing need to speed up short-distance signal communications between wiring boards of information processing equipment and between LSI chips of a wiring board. For these reasons, the shift from conventional data transmission using metal cables and/or metal wiring to optical transmission is desired.

In the optical transmission, optical elements (such as light-emitting elements and light-receiving elements) are generally used for conversion from optical signals to electrical signals and from electrical signals to optical signals. Further, optical waveguides (such as optical fibers) are used as data transmission media in the optical transmission. Various proposals have been made on the photoelectric conversion module, also called "optical module", in which an optical element is supported on a module substrate and the optical coupling structure between an optical element and a fiber optic cable.

For instance, Japanese Laid-Open Patent Publication No. 2003-207694 proposes an optical coupling structure between an optical element and a multifiber optic cable on a wiring board. The proposed optical coupling structure includes a flat cable connector fixed at an end of the fiber optic cable, a flat package (as a connector receptacle) in which the optical element and LSI chips are incorporated, a clamp spring and guide pins. The cable connector is stacked on a surface of the package, and then, the connector and the package are fastened with the clamp spring and the guide pins in such a manner as to allow mating and unmating of these connection parts along a vertical direction of the wiring board. Upon mating of the package with the cable connector, the optical element is optically coupled to the fiber optic cable.

There is also proposed an optical connection part 903 of the type shown in FIG. 26, which is specifically designed to mate with a so-called MT (Mechanically Transferable) connector so as to provide an optical coupling between an optical element 902 and a multifiber optic cable 905, on "The Fifth Forum on Electronic SI Research, Feb. 26, 2004, Abstract, Page 86 (bottom section)". The proposed optical connection part 903 is characterized as having a right-angle optical path conversion waveguide. The optical element 902 is face-up mounted on a wiring board 901 via bump contacts, and the MT connector has a plug 906 fixed to an end of the fiber optic cable 905. The optical connection part 903 is attached at a lower face thereof to an optical face of the optical element using an adhesive 904. The optical connection part 903 and the connector plug 906 are arranged with an end face of the optical connection part 903 abutting on an end face of the connector plug 906. Then, the optical connection part 903 and the connector plug 906 are fastened together with a clamp spring 907 in such a manner as to allow mating and unmating of these connection parts 903 and 906 along a lateral direction of the wiring board 901.

Japanese Laid-Open Patent Publication No. 2002-170965 proposes an optical module mounted on a printed circuit board and having an optical element supported on a silicon substrate. The silicon substrate has two opposite main surfaces: one main surface supporting thereon the optical element and the other main surface having positioning projections and depressions engaged with positioning projections and depressions of the printed circuit board so as to allow optical axis alignment of the optical element with an optical waveguide (such as an fiber optic cable).

Japanese Laid-Open patent Publication No. 2004-31743 proposes, although not directly related to an optical module, an electronic device in which an electronic component is mounted on a ceramic substrate. The ceramic substrate has two laminated ceramic substrate members joined together in such a manner that the direction of lamination of ceramic insulating layers in one substrate member is perpendicular to the direction of lamination of ceramic insulating layers in the other substrate member. The ceramic substrate also has a shield member interposed between two laminated substrate members so that the substrate members are electrically independent of each other. This substrate configuration is advantageous to achieve a low profile of the electronic device. It should be noted that the arrangement of an optical element on such a laminated ceramic substrate is neither disclosed nor suggested by Japanese Laid-Open Patent Publication No. 2004-31743.

SUMMARY OF THE INVENTION

In the above-proposed optical coupling structure, however, the flat package cannot be connected with a fiber optic cable by a commercially available optical fiber connector such as an MT type connector in the ordinary way. In order to connect the flat package with a fiber optic cable, it is necessary to produce a dedicated connector plug separately in accordance with the shape and dimensions of the package. It is also necessary that the guide pin and the clamp spring be dedicated to the proposed optical coupling structure. Thus, the proposed optical coupling structure lacks in general versatility, without general-purpose parts being used to advantage, and fails to provide a cost reduction.

The above-proposed optical connection part 903 is not structurally adapted to mount thereon the optical element 902. The optical element 902 is mounted on the wiring board 901 as shown in FIG. 26, so that the optical axis alignment between the optical element 902 and the cable 905 cannot be easily done. The proposed optical connection part 903 fails to achieve high optical coupling efficiency and tends to cause a high loss of optical communication.

In the above-proposed optical module, the silicon substrate has a three-dimensional intricate shape in which the positioning projections and depressions are defined by a plurality of planes including inclined planes. It is required to acquire an advanced special technique to process the silicon support into such an intricate shape. The difficulty and cost of processing the silicon substrate become thus increased. In addition, the proposed optical module may not meet the requirements for a low profile and high-precision optical axis alignment.

It is conceivable to mount an optical element on the above-proposed laminated ceramic substrate to thereby form an optical module. However, the proposed laminated ceramic substrate does not have a structure for optical axis alignment so that the optical axis alignment of the optical element with an optical waveguide could not be easily done with a high degree of precision. This results in inefficient optical coupling. Moreover, a circuit cannot be formed throughout the proposed laminated ceramic substrate as two substrate members of the ceramic substrate are held electrically independent of each other.

Accordingly, an object of the present invention is to provide an optical module capable of mating with a commercially available optical fiber connector, without the use of a dedicated connection part or parts so as to achieve high optical coupling efficiency, general versatility and cost performance and to provide a substrate suitable for use in such an optical module.

Another object of the present invention is to provide an optical coupling structure for coupling an optical module and a fiber optic cable so as to achieve a high optical coupling efficiency, general versatility and cost performance.

Still another object of the present invention is to provide an optical module having a low profile and being capable of mating with another optical device so as to achieve high optical coupling efficiency, general versatility and cost performance and to provide a laminated substrate suitable for use in such an optical module.

According to a first aspect of the invention, there is provided an optical module for coupling with a fiber optic cable through an optical connector, comprising: a module body connectable with a plug of the optical connector by a dedicated guide pin, with a side surface of the module body being opposed to a mating surface of the connector plug at which an end face of the fiber optic cable is exposed; and an optical element mounted to the module body and having an optical axis brought into alignment with an optical axis of the fiber optic cable upon fitting of the guide pin into the module body and the connector plug.

According to a second aspect of the invention, there is provided a ceramic substrate for an optical module, the optical module being adapted to mate with an optical connector plug upon fitting of a guide pin into the optical module and the connector plug, the ceramic substrate comprising: a ceramic substrate body having a main substrate surface, opposite side surfaces extending perpendicular to the main substrate surface and a recess formed in one of the side surfaces; and a filler having better machinability than that of the ceramic substrate body and being packed in the recess and precisely machined to define at least part of a guide hole into which the guide pin is inserted.

According to a third aspect of the invention, there is provided an optical coupling structure, comprising: a fiber optic cable; an optical connector having a plug fixed to an end of the fiber optic cable; a guide pin; and an optical module including a module body connected with the connector plug by the guide pin, with a side surface of the module body being opposed to a mating surface of the connector plug at which an end face of the fiber optic cable is exposed, and an optical element mounted to the module body and having an optical axis brought into an optical axis of the fiber optic cable upon fitting of the guide pin into the module body and the connector plug.

According to a fourth aspect of the invention, there is provided an optical module, comprising: a substrate including a first substrate member that has a plurality of insulating layers laminated together in a first layer lamination direction and a second substrate member that has a plurality of insulating layers laminated together in a second layer lamination direction, the first and second substrate members allowing electrical connection therebetween and being joined together in such a manner that the first and second layer lamination directions are substantially perpendicular to each other; an optical element mounted to the first substrate member; and a coupling element arranged on the first substrate to provide a positional reference for optical axis alignment of the optical element with a counterpart optical device.

According to a fifth aspect of the invention, there is provided a substrate for an optical module, the optical module having an optical element and a coupling element, the substrate comprising: a first ceramic substrate member having a plurality of ceramic insulating layers laminated together in a first layer lamination direction, a mount portion to which the optical element is mounted and a hole formed by precision machining so as to receive therein the coupling element; and a second ceramic substrate member having a plurality of ceramic insulating layers laminated together in a second layer lamination direction, the first and second ceramic substrate members allowing electrical connection therebetween and being joined together in such a manner that the first and second layer lamination directions are substantially perpendicular to each other.

The other objects and features of the invention will also become understood from the following description.

DESCRIPTION OF THE EMBODIMENTS

Figure 1:
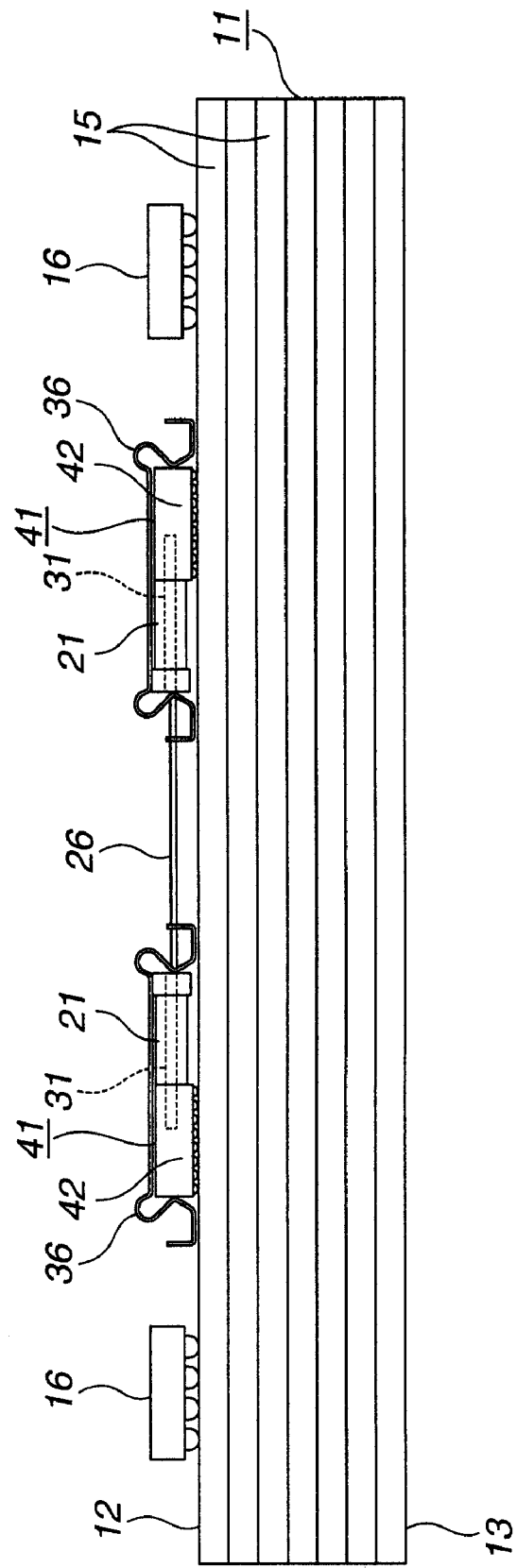
FIG. 1 is a front view of an optical coupling structure in which an optical module is mounted on a printed circuit board and coupled to a fiber optic cable via an MT connector according to a first embodiment of the invention.

The present invention will be described below by way of the following first to eighth exemplary embodiments, in which like parts and portions are designate by like reference numerals.

It is herein noted that the first to fourth embodiments are designed for use with commercially available optical fiber connectors; whereas the fifth to eighth embodiments are designed to for use with optical devices.

The optical fiber connector is defined as a part for interconnecting optical fibers or fiber optic cables. Typical examples of the commercially available optical connector include F12-type optical connectors, also called "MT (Mechanically Transferable) connectors", to interconnect multifiber optic cables according to JIS C 5981 (established on 1993 and revised on 1998). In JIS C 5981, the specifications for an MT connector having a rectangular plug (or ferrule) with guide pins as an alignment mechanism and a clamp-spring coupling mechanism to connect the optic cables are provided based on JIS C 5962. There are international standards IEC 60874-16 (revised on 1994) equivalent to JIS C 5981.

The plug for the MT connector is rectangular parallelepiped in shape and has a dimension of 8.0 mm with a tolerance of ±0.1 mm along the direction of insertion of the guide pins (hereinafter referred to as "X-axis direction" for convenience), a dimension of 6.4 to 7.0 mm along the direction of fiber row of the multifiber optic cable (hereinafter referred to as "Y-axis direction") and a dimension of 2.5 to 3.0 mm along the direction perpendicular to both the X- and Y-axis directions (hereinafter referred to as "Z-axis direction) according to JIS C 5981.

The guide pin for the MT connector is defined as a part for aligning two MT connector plugs with each other upon insertion of the guide pin into respective guide holes of the MT connector plugs. According to JIS C 5981, the MT connector guide pin has a length of 10.8 mm or longer and a diameter of about 0.7 mm. Further, the guide holes of the MT connector plug are made with a diameter of 0.7±0.001 mm and a hole-to-hole pitch of 4.6±0.003 mm according to JIS C 5981.

The clamp spring for the MT connector is defined as a part for holding two MT connector plugs together. The MT connector clamp spring has a free length of 15.7 mm or shorter between clamping portions thereof according to JIS C 5981.

The optical device has at least one of an optical transmission function, a light gathering function and a light reflecting function. Examples of the optical device with the optical transmission function include an optical waveguide and a fiber optic cable with or without an optical connector (plug). Examples of the optical device with the light gathering function include a lens mechanism such as a microlens array. Examples of the optical device with the light reflecting function include an optical path conversion device. These optical devices can be used solely or in combination thereof.

First Embodiment

The first embodiment will be now explained below with reference to FIGS. 1 to 7.

As shown in FIG. 1, two optical modules 41 and IC chips 16 are mounted on a printed circuit board 11 in the first embodiment. The printed circuit board 11 has a plurality of insulating layers 15 and conducting layers alternately laminated together to define two opposite main surfaces 12 and 13. Although not shown in the drawings, pads are arranged on the upper main surface 12 of the printed circuit board 11 for electrical connections to the optical modules 41 and for electrical connection to IC chips 16 via bump contacts.

Further, two optical modules 41 are connected to each other via a multifiber optic cable 26 and MT connectors, as shown in FIG. 1, in the first embodiment. To be more specific, each optical module 41 is optically coupled to the fiber optic cable 26 using a connector plug 21, two guide pins 31 and a clamp spring 36 designed for the MT connector in compliance with JIS C 5981. The MT connector plug 21 is fixed at an end of the fiber optic cable 26. The MT connector guide pins 31 are fitted in guide holes 22 of the connector plug 21 and guide holes 80 of the optical module 41 to align and connect the optic cable 26 and the optical module 41 with each other in a plug-pin-plug configuration. The MT connector clamp spring 36 is fitted on the connector plug 21 and the optical module 41 to secure the connector plug 21 and the optical module 41 together.

The MT connector plug 21 is generally formed of a resin and rectangular parallelepiped in shape with a length dimension of 8.0±0.1 mm along the X-axis direction, a width dimension of 6.4 to 7.0 mm along the Y-axis direction and a height dimension of 2.5 to 3.0 mm along the Z-axis direction. The MT connector guide pins 31 are formed of e.g. stainless steel with a length of 10.8 mm or longer and a diameter of about 0.7 mm. As the guide pins 31, there may be used "CNF125A-21" having a diameter of 0.699 mm according to JIS C 5981. The guide holes 22 are formed in a mating surface 23 of the connector plug 21 (at which the cable 26 has its end face exposed), and has a diameter of 0.7±0.001 mm and a hole-to-hole pitch of 4.6±0.003 mm. The MT connector clamp spring 36 is formed of an elastic metal material such as stainless steel with a free length of 15.7 mm or shorter between clamp portions 37 thereof.

Further, each of the optical modules 41 has a module body 42 and an optical element 81 mounted to the module body 42 as shown in FIGS. 2, 3, 5 and 6.

The module body 42 has a shape and dimensions to mate and fit with the MT connector plug 21, or is substantially the same in shape and dimensions as the connector plug 21, so as to function as a plug receptacle. In other words, the module body 42 has substantially the same rectangular parallelepiped shape and dimensions as those of the connector plug 21. In order to secure the module body 42 and the connector plug 21 together with the clamp spring 36 according to JIS C 5981, it is especially important to control the X-axis dimension of the module body 42 precisely. As the X-axis dimension of the connector plug 21 is specified as 8.0±0.1 mm, the module body 42 preferably has a X-axis dimension of 8.0±0.3 mm, more preferably 8.0±0.1 mm. Further, the module body 42 preferably has a Y-axis dimension of 6.0 to 10.0 mm, more preferably 6.4 to 7.0 mm, and a Z-axis dimension of 2.0 to 5.0 mm, more preferably 2.5 to 3.5 mm as the Y- and X-axis dimensions of the connector plug 21 are specified as 6.4 to 7.0 mm and 2.5 to 3.0 mm, respectively. For instance, the X-, Y- and X-axis dimensions of the module body 42 are controlled to 8.0 mm, 7.0 mm and 3.0 mm, respectively, in the first embodiment.

Figure 2:
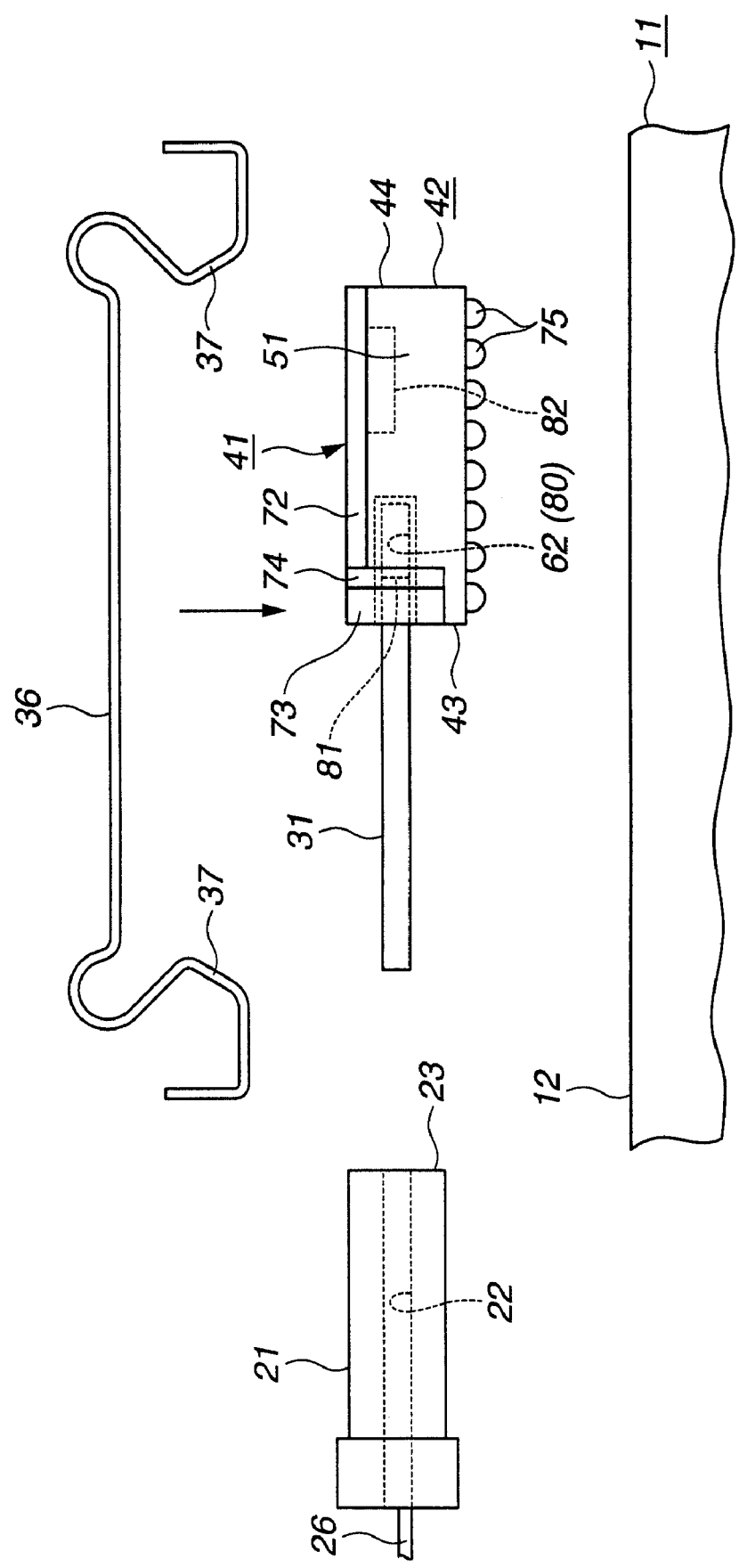
FIG. 2 is an exploded view of the optical coupling structure according to the first embodiment of the invention.
Figure 3:
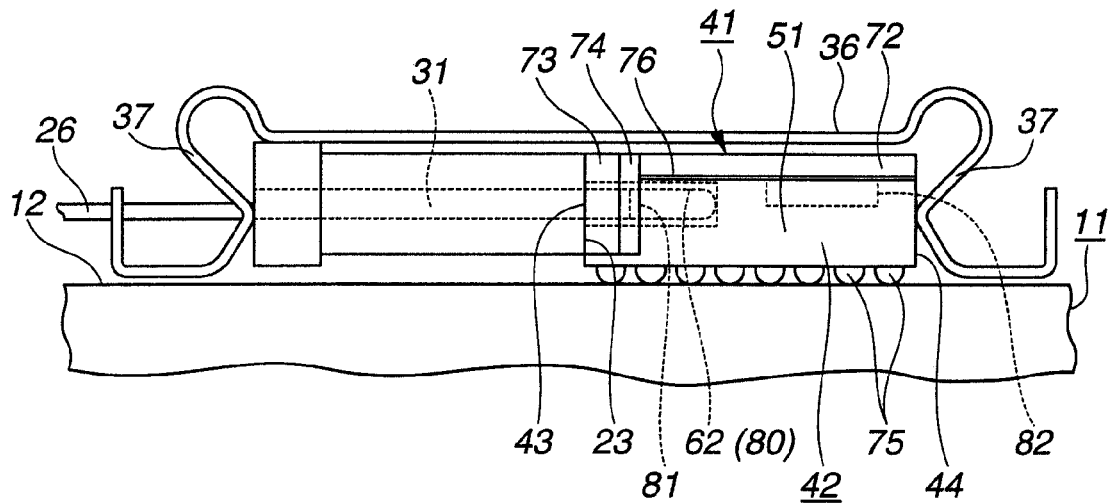
FIG. 3 is a front view showing mating of the optical module and the connector according to the first embodiment of the invention.
Figure 5:
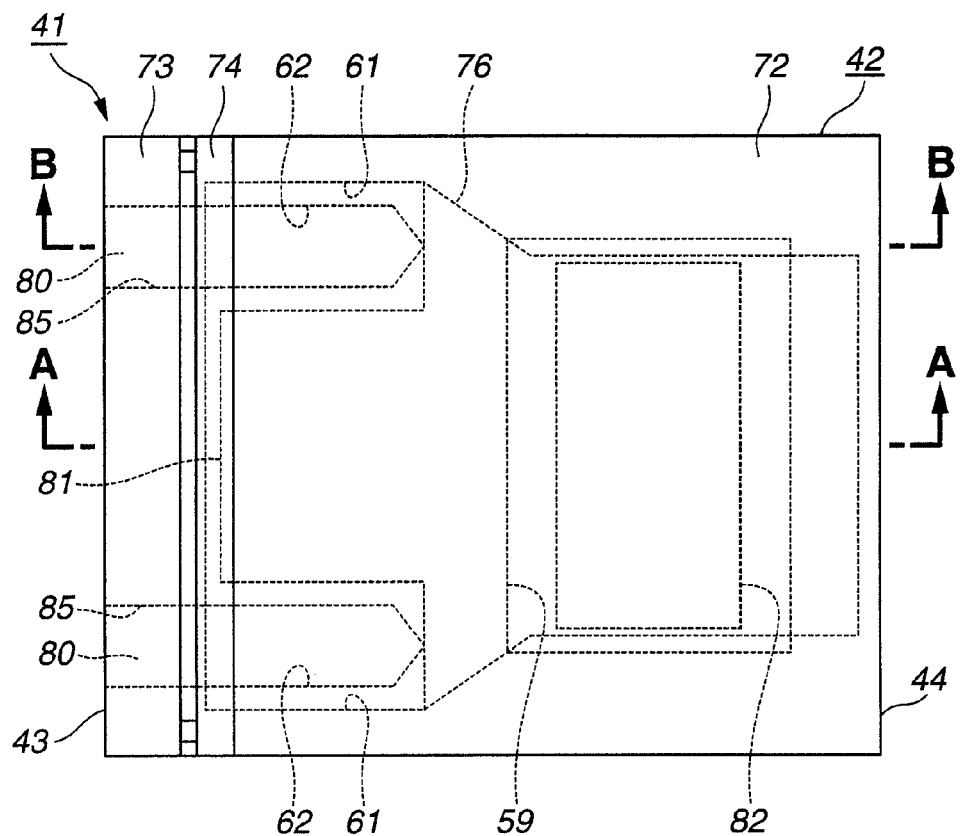
FIG. 5 is a plane view of the optical module according to the first embodiment of the invention.

The module body 42 has two opposite side surfaces 43 and 44 along the Y-Z direction as shown in FIGS. 2, 3 and 5. The side surface 43 of the module body 42 is opposed to the mating surface 23 of the connector plug 21, and two module holes 80 are formed apart in the side surface 43 of the module body 42 corresponding to the guide holes 22 of the connector plug 21. As the guide holes 22 are made with a diameter of 0.7±0.001 mm and a hole-to-hole pitch of 4.6±0.003 mm, the guide holes 80 preferably has a diameter of 0.7±0.001 mm and a hole-to-hole pitch of 4.6 ±0.003 mm for proper optical axis alignment. In the first embodiment, the guide holes 80 are about 3.0 mm in depth. On the other hand, the side surface 44 of the module body 42 is pushed by the clamp portion 37 of the clamp spring 36 toward the connector plug 21.

For a lower profile of the optical module 41, it is desirable that an upper main surface of the body module 42 and an upper surface of the connector plug 21 are substantially in the same plane (i.e. substantially flush with each other).

The optical element 81 is a light-emitting element capable of converting electrical signals into optical signals and emitting the optical signals to a specific area, or a light-receiving element capable of receiving optical signals and converting the optical signals into electrical signals. Examples of the light-emitting element include a light emitting diode (LED), a laser diode (LD) and a vertical cavity surface emitting laser (VCSEL). Examples of the light-receiving element include a pin photo diode (pin PD) and an avalanche photo diode (APD). The optical element 81 can be made of a suitable material, such as Si, Ge, InGaAs, GaAsP and GaAlAs. The optical element 81 has a plurality of light emitting or receiving points e.g. twelve light emitting or receiving points arranged in an array.

It is herein noted that, in the first embodiment, one of the optical modules 41 (located on the right side of FIG. 1) is of surface emitting type in which the optical element 81 is a vertical surface emitting laser: VCSEL and the other of the optical modules 41 (located on the left side of FIG. 1) is of surface receiving type in which the optical element 81 is a vertical surface receiving photodiode.

In order to protect the optical element 81 securely for improvements in reliability, it is preferable that the optical element 81 is incorporated in the module body 42 without being exposed at any surface of the optical module 41.

The optical module 41 may additionally include an IC (Integrated Circuit) element 82 to drive the optical element 81 upon transmission of the electrical signals from the printed circuit board 11 to the optical element 81, or to receive and amplify the electrical signals from the light-receiving optical element 81. Namely, the IC element 82 is an integrated circuit for driving the optical element 81 (so called "driver IC") when the optical element 81 is a light-emitting element. When the optical element 81 is a light-receiving element, the IC element 82 is an integrated circuit for amplifying the electrical signals (so called "receiver IC). Alternatively, both of driver IC and receiver IC may be used in combination when two optical elements i.e. light-emitting and light-receiving elements are provided in a single optical module as will be described later in the fourth embodiment. The arrangement of the IC element 82 in the optical module 41 allows a reduction of conduction length between the optical element 81 and the IC element 82 so as to increase the operating speed of the optical module 41 as compared to the case where the optical element 81 is connected with an IC element external to the optical module 41.

In order to protect the IC element 82 securely for improvements in reliability, it is also preferable that the IC element 82 is incorporated in the module body 42 without being exposed at any surface of the optical module 41.

The optical module 41 may further include an electronic component or circuit element 83 other than the optical element 81 and the IC element 82. Examples of the electronic component 83 include a chip transistor, a chip diode, a chip resistor, a chip capacitor and a chip inductor. Examples of the circuit element 83 include a thin film transistor, a thin film diode, a thin film resistor, a thin film capacitor and a thin film inductor. This element 83 may be active or passive. Especially when the electronic or circuit element 83 is a capacitor, the optical module 41 becomes low in resistance and inductance to obtain improvements in performance.

The optical element 81, the IC element 82 and the electronic or circuit element 83 generate heat during operation. Since the resinous connector plug 21 is not so high in thermal conductivity, the heat from these elements 81, 82 and 83 cannot be diffused efficiently to the outside of the optical module 41 through the connector plug 21. This can be a cause of operation instability in the optical module 41. It is thus desirable that the module body 42 is mainly composed of a material having better thermal conduction properties i.e. a higher thermal conductivity than that of the resinous connector plug 21 in order to diffuse the heat from the elements 81, 82 and 83 efficiently to the outside of the optical module 41 and to secure operation stability of the optical module 41. Examples of the highly thermal conductive material of the module body 42 include inorganic materials such as metallic materials and ceramic materials.

In the first embodiment, the module body 42 preferably includes a ceramic substrate 51 as a main module body component to support thereon the optical element 81. It is particularly desirable that the ceramic substrate 51 is a laminated ceramic substrate, a shown in FIGS. 4, 6 and 7, having a plurality of ceramic insulating layers 52 and conducting layers 57 alternately laminated together to form a substrate body thereof. The insulating layers 52 can be made of any ceramic material having good thermal conduction properties, such as alumina, beryllia, mullite, aluminium nitride, silicon nitride, boron nitride or silicon carbide. The laminated ceramic substrate 51 further includes through-hole conductors 58 formed between the conducting layers 57. The arrangement of such conducting layers 57 and though-hole conductors 58 in the laminated ceramic substrate 51 allows easy electrical connections of the optical element 81 to any other devices e.g. the IC element 82, the electronic component or circuit element 83 and the printed circuit board 11.

Figure 4:
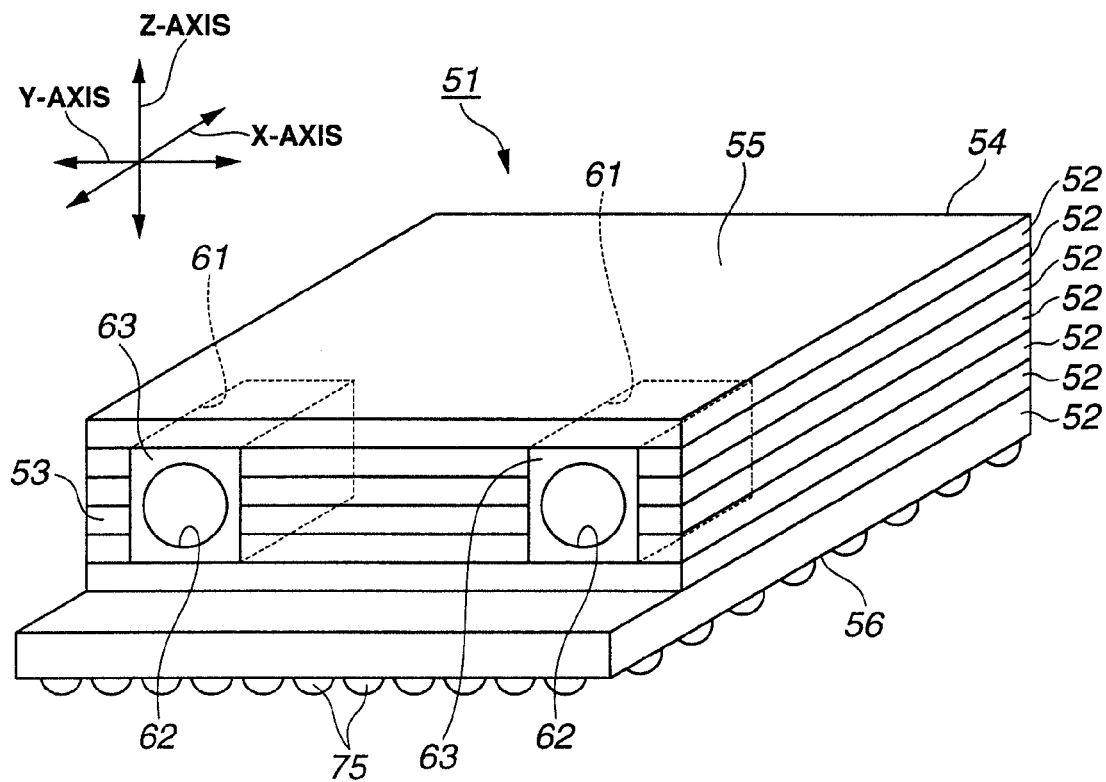
FIG. 4 is a perspective view of a ceramic substrate of the optical module according to the first embodiment of the invention.

The ceramic substrate 51 has two opposite main surfaces 55 and 56 each extending along the X-Y direction and a plurality of side surfaces extending perpendicular to the main surfaces 55 and 56, which include two opposite side surfaces 53 and 54 extending along the Y-Z direction in parallel with the side surfaces 43 and 44 of the module body 42, respectively, as shown in FIG. 4.

Two apertures 62 are formed in the side surface 53 of the ceramic substrate 51 so as to constitute at least parts of the guide holes 80 of the optical module 41. It is desirable to cut rectangular parallelepiped recesses 61 in the side surface 53 of the substrate body of the ceramic substrate 51, pack fillers 63 into the recesses 61, and then, form two circular apertures 62 by precision machining in the fillers 63 at positions corresponding to the guide holes 22 of the connector plug 21. As shown in FIGS. 2 to 7, the precision apertures 62 are circular in cross section and have the same diameter and hole-to-hole pitch as the guide holes 22 (i.e. a diameter of 0.7±0.001 mm and a hole-to-hole pitch of 4.6±0.003 mm). When at least parts of the guide holes 80 are formed by precision machining, the optical axis alignment between the optical element 81 and the fiber optic cable 26 can be achieved more easily and properly by insertion of the guide pins 31 into such precisely machined holes 80. This allows assured improvements in optical coupling efficiency.

Further, the filler 63 is preferably lower in hardness and better in machinability than the substrate body of the ceramic substrate 51. Since the ceramic substrate 51 has not only the advantages of good thermal conduction properties and high dimensional stability but also the disadvantages of high hardness and poor machinability, it would be difficult and costly to form apertures by precision machining directly in the ceramic substrate 51. By contrast, the apertures 62 can be easily formed in the good machinable fillers 63 at lower cost. These apertures 62 can be formed by any precision machining process such as drilling, punching or laser machining. In view of the cost, the apertures 62 are preferably drilled by the use of a precision drill. Examples of the fillers 63 include a resinous material, a metal material and a glass material. Among others, the resinous material is preferably used as the filler 63. The resinous material is generally lower in hardness and price than the ceramic material, so that the use of such a low-hardness, low-priced resinous material as the filler 63 allows a reduction of not only manufacturing labor cost but also material cost.

The optical element 81 and the IC element 82 can be located on the same surface portion or different surface portions of the ceramic substrate 51. As shown in FIGS. 2, 3, 5 and 6, the optical element 81 and the IC element 82 are preferably attached to the side surface 53 and the main surface 55 of the ceramic substrate 51, respectively, such that the light emitting or receiving face of the optical element 81 is directed toward the X-axis direction and oriented along the Y-axis direction so as to establish an optical coupling between the optical element 81 and the fiber optic fiber 26 without the need for optical path conversion.

In the first embodiment, cavities 59 are formed in the main surfaces 55 and 56 of the ceramic substrate 51 such that the IC element 82 and the capacitor 83 are placed in the cavities 59 of the main surfaces 55 and 56, respectively. A gap in each cavity 59 may be filled with a silicone resin or thermal grease 84 for improvements in thermal conduction properties.

As shown in FIGS. 2, 3 and 5 to 7, the module body 42 may further include a flexible substrate 76, a metal piece 72, a microlens array 73, a spacer 74 and electric terminals 75.

The flexible substrate 76 is used to support thereon the optical element 81 and the IC element 82 while allowing electrical conduction between the optical element 81 and the IC element 82 especially when the optical element 81 and the IC element 82 are located on different surface portions of the ceramic substrate 51. More specifically, the flexible substrate 76 has a surface portion adhered to the main surface 55 of the ceramic substrate 51 and an end portion protruding from and turned along the side surface 53 of the ceramic substrate 51 so as to extend perpendicular to the surface portion of the flexible substrate 76. The optical element 81 and the IC element 82 are thus supported on and joined to the same surface side of the flexible substrate 76 via bump contacts so that the electrical conduction between the optical element 81 and the IC element 82 is established through a wiring pattern of the flexible substrate 76. In the first embodiment, the flexible substrate 76 is made of a polyimide resin.

The microlens array 73 is arranged on the side surface 53 of the ceramic substrate 51, with the spacer 74 disposed between the microlens array 73 and the ceramic substrate 51. The microlens array 73 is formed into a flat plate shape of an optically transparent material so as to function as a condenser to reduce light transmission losses, and has a plurality of micro lenses e.g. twelve micro lenses, arranged in an array along Y-axis direction, corresponding to the light emitting points of the optical element 81. The spacer 74 is provided for focal length adjustment and formed in a rectangular frame shape of e.g. a resinous material or metal material having resistance to soldering heat.

Figure 7:
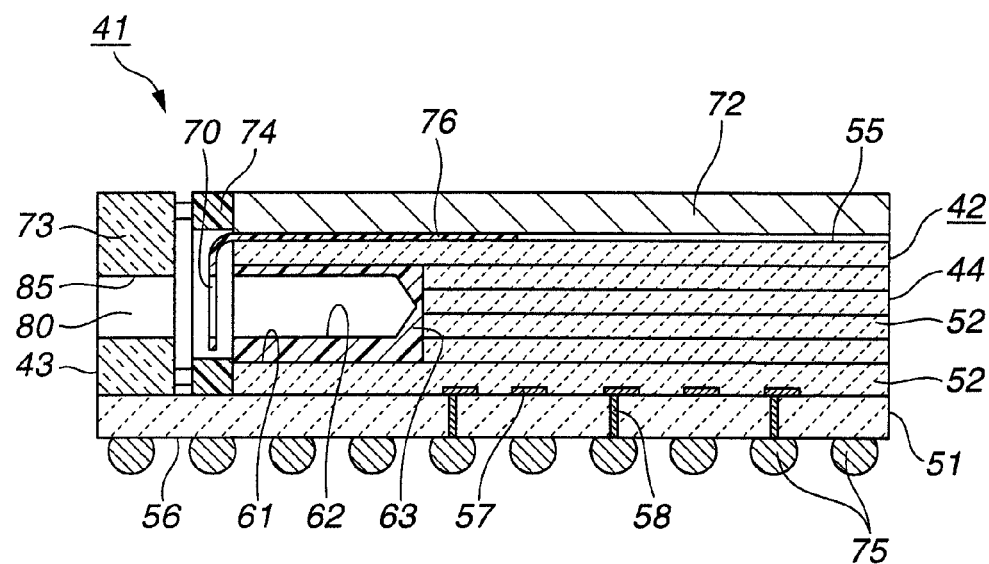
FIG. 7 is a section view of the optical module, when taken along a line B-B of FIG. 5, according to the first embodiment of the invention.

Apertures 70 and 85 are made through the flexible substrate 76 and the microlens array 73, respectively, at positions corresponding to the precision apertures 62 of the ceramic substrate 51 such that these apertures 62, 70 and 85 communicate with one another to form the guide holes 80 of the optical module 41 in combination thereof as shown in FIG. 7. Thus, the apertures 70 and 85 also have the same diameter and hole-to-hole pitch as the guide holes 22 (i.e. a diameter of 0.7±0.001 mm and a hole-to-hole pitch of 4.6±0.003 mm).

The metal piece 72 is provided in any surface of the module body 42 other than the side surfaces 43 and 44, e.g., adhered to the flexible substrate 76 on the main surface of the module body 42, so as to diffuse the heat from the optical element 81 and the IC element 82 etc. efficiently to the outside of the optical module 41 and to protect the optical element 81 and the IC element 82 from external electromagnetic waves. This allows improvements in operation stability and performance of the optical module 41. The metal piece 72 can be made of any metallic material such as copper, copper alloy, iron, nickel, iron-nickel alloy or aluminum and can be of any form, such as a plate form, a foil or leaf form or a laminar form. In the first embodiment, the metal piece 72 is made of so-called nickel silver (Cu—Zn—Ni alloy) and shaped into a plate lid having a thickness of about 0.5 mm and a surface area almost equal to the upper main surface of the module body 42.

Figure 6:
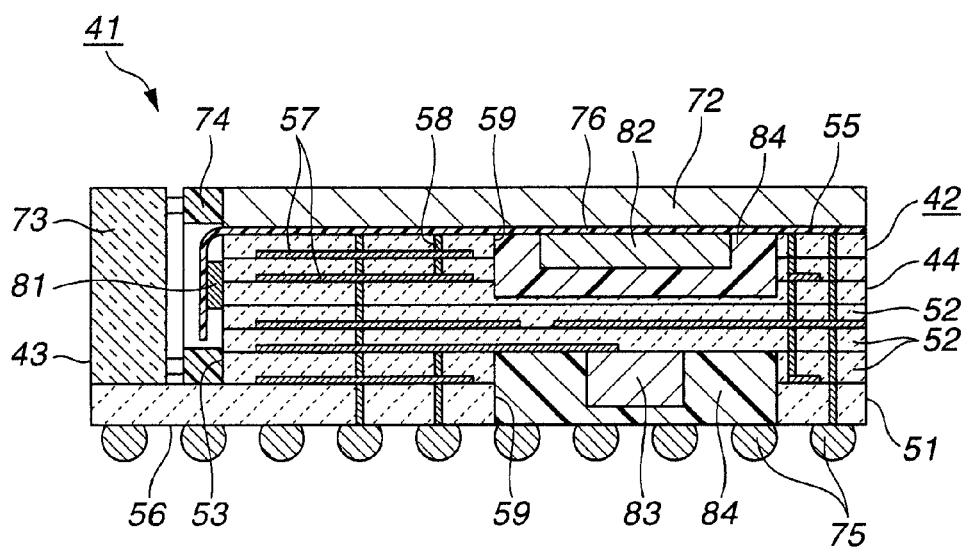
FIG. 6 is a section view of the optical module, when taken along a line A-A of FIG. 5, according to the first embodiment of the invention.

The electric terminals 75 are preferably arranged on any surface of the ceramic substrate 51 other than the side surfaces 53 and 54 for easy electrical connections of the optical module 41 to the printed circuit board 11. The electric terminals 75 can be of any form. Examples of the electric terminals 75 include bump contacts, pads and leads. In the first embodiment, the electric terminals 75 are solder bumps arranged in an array on the lower main surface 56 of the ceramic substrate 51 as shown in FIGS. 3, 6 and 7. Some of the solder bumps 75 are used to diffuse heat therethrough to the outside of the optical module 41 in the first embodiment.

As shown in FIG. 3, the optical module 41 and the fiber optic cable 26 are arranged on the printed circuit board 11 with the mating surface 23 of the connector plug 21 being opposed to and in parallel with the side surface 43 of the module body 42. In this state, the opposite ends of each guide pin 31 are inserted and fitted in the guide hole 22 of the connector plug 21 and in the guide hole 80 of the optical module 41 to make a mechanical connection between the optical module 41 and the connector plug 21 in a plug-pin-plug configuration. The optical axis alignment between the optical element 81 of the optical module 41 and the fiber optic cable 26 is also achieved upon insertion of the guide pins 31 into the guide holes 22 and 80. Then, the optical module 41 and the connector plug 21 are securely fixed by holding the optical module 41 and the connector plug 21 in between the clamp portions 37 of the clamp spring 36 in such a manner as to press the clamp portions 37 against the side surface 44 of the optical module 41 and the side surface of the connector plug 21, respectively.

The operations of the optical module 41 will be briefly explained below.

In response to power supply from the printed circuit board 11 to the optical module 41 of surface emitting type, the light-emitting optical element 81 and the driver IC element 82 become active. When the printed circuit board 11 generates electrical signals in this active state, the electrical signals are first inputted into the driver IC element 82 and then transmitted from the driver IC element 82 to the light-emitting element 81 via the wiring pattern of the flexible substrate 76. The light-emitting element 81 converts the electrical signals into optical signals and outputs the optical signals toward the end of the fiber optic cable 26. The optical signals pass through the transparent or translucent flexible substrate 76 and become converged by the micro lenses of the microlens array 73 to enter into the cores of the fiber optic cables 26 and thereby travel to the optical module 41 of surface receiving type.

The manufacturing method of the optical module 41 will be next explained below.

The ceramic substrate 51 is first produced by e.g. preparing a green ceramic substrate body with two recesses 61 formed in the side surface thereof, sintering the green body, packing the fillers 63 into the recesses 61, and then, subjecting the fillers 63 to precision machining to form two apertures 62. The preparation process of the green ceramic substrate body may includes the steps of providing a plurality of green ceramic sheets, making two cuts in an edge portion of each of the green ceramic sheets and laminating the green ceramic sheets together such that the recesses 61 are defined by the cuts. With this, the recesses 61 can be easily formed in the ceramic substrate 51 at lower cost because the ceramic substrate 51 is still green in the recess forming process.

For instance, the ceramic substrate 51 can be produced by the following procedure.

A raw slurry material is prepared by mixing and kneading various ingredients such as alumina powder, organic binder, solvent and plasticizer uniformly. The prepared slurry material is subjected to sheet forming with a doctor blade, thereby yielding a plurality of green sheets of a given thickness. Through holes are formed by punching in specified positions of the green sheets, and metal paste such as tungsten paste is filled in the through holes. Cuts are made in edge portions of the green sheets. Further, metal paste such as tungsten paste is printed on surfaces of the green sheets. The green sheets are laminated together in such a manner that the cuts overlap one another, and then, pressed under a given pressure so as to obtain a green sheet laminate. The green sheet laminate is dried and degreased by known processes and sintered at temperatures (e.g. 1650 to 1950° C.) sufficient for the sintering of alumina, thereby forming the ceramic substrate 51. In the thus-formed ceramic substrate, the insulating layers 52, the conducting layers 57, the through-hole conductors 58 and the recesses 61 are made up of the green sheets, the metal paste printed on the green sheets, the metal paste filled in the through holes and the cuts in the green sheets, respectively.

On the other hand, the fillers 63 are prepared as a thermosetting resin containing therein inorganic filler material by mixing e.g. 80 parts by weight of bisphenol-F epoxy resin (available under the trade name of "EPICOAT 807" from JER Co., Ltd.), 20 parts by weight of cresol-novolac epoxy resin (available under the trade name of "EPICOAT 152" from JER Co., Ltd.), 5 parts by weight a curing agent (available under the trade name of "2P4MZ-CN" from Shikoku Corp.), 200 parts by weight of a silica filler (available under the trade name of "TSS-6" from Tatsumori Ltd.) treated with a silane coupling agent (available under the trade name of "KBM-403" from Shin-Etsu Chemical Co., Ltd.) and an effective amount of antifoaming agent (available under the trade name of "BERENOL S-4" from San Nopco Limited), and then, kneading the thus-obtained mixture with a three-roll kneader. After packing the fillers 63 in the respective recesses 61 of the ceramic substrate 51 by a known process such as print process, the ceramic substrate 51 is heated at 120° C. for 1 hour so that the fillers 63 get semi-hardened. The fillers 63 are not completely hardened at this point for ease of the following aperture forming process.

The apertures 62 are formed in the semi-hardened fillers 63, respectively, using a precision drill. By such precision machining process, the apertures 62 can be made easily and properly so as to constitute at least parts of guide holes 80 as an accurate positional reference for optical axis alignment. Further, the formation of the precision apertures 62 in the resinous fillers 63 allows reductions in processing and labor cost as a cost-cutting measure for the optical module 41. After that, the ceramic substrate 51 may be processed with a surface polishing machine to polish the side surface 53 of the ceramic substrate 51 and thereby remove excessive amounts of fillers 63 protruding from the apertures 62.

The thus-obtained ceramic substrate 51 is heated at 150° C. for 5 hours such that the fillers 63 get hardened completely. Then, the ceramic substrate 51 is subjected to finishing by a known process to make a fine adjustment of the diameter of the precision apertures 62 to 0.700 mm accurate to ±0.001 mm.

The ceramic substrate 51 is completed in this way. Subsequently, the solder bumps 75 are provided on the completed ceramic substrate 51 by a known process.

Next, the ceramic substrate 51 and the other components are assembled into the optical module 41 by the following procedure.

Upon preparation of the flexible substrate 76, the optical element 81 and the IC element 82 are mounted on one main surface of the flexible substrate 76. The ceramic substrate 51, the flexible substrate 76 supporting thereon the optical element 81 and the IC element 82, the spacer 74 and the microlens array 73 are arranged in order of mention. The guide pins 31 are inserted and fitted into the apertures 62, 70 and 85 for proper positioning of the flexible substrate 76 and the microlens array 73 on the ceramic substrate 51. The surface portion of the flexible substrate 76 is turned at the right angle with respect to the end portion of the flexible substrate 76, and then, adhered to the main surface 55 of the ceramic substrate 51 with an anisotropic conductive film. Further, the metal lid 72 is adhered to the surface portion of the flexible substrate 76 with a silver-epoxy adhesive. Electrical conduction between the conductive members of the ceramic substrate 51 and the flexible substrate 76 may be established via a conductive paste, a conductive film or a solder joint. As a result, the subassembly of the optical module 41 and the guide pins 31 (shown in FIG. 2) is obtained in which the guide pins 31 have respective portions protruding from the module body 42. The thus-obtained subassembly is placed on the main surface 12 of the printed circuit board 11 by soldering the optical module 41 to the main surface 12 of the printed circuit board 11. Alternatively, it may be possible to soldering the ceramic substrate 51 onto the main surface 12 of the printed circuit board 11, and then, attaching the flexible substrate 76, the spacer 74 and the microlens array 73 to the ceramic substrate 51 with the guide pins 31.

Finally, the optical module 41 and the connector plug 21 are held together with the guide pins 31 and the clamp spring 36. Herein, the MT connector plug 21 is already fixed to the end of the fiber optic cable 26. The connector plug 21 is placed on the printed circuit board 11 with the mating surface 23 of the connector plug 21 being opposed to the side surface 43 of the optical module 41, and then, brought closer to the optical module 41 such that the protruding portions of the guide pins 31 fit into the guide holes 22 of the connector plug 21 until the mating surface 23 of the connector plug 21 and the side surface 43 of the optical module 41 come into contact with each other. As the optical module 41 and the guide pins 31 are built into a subassembly in advance, the optical module 41 and the connector plug 21 can be connected easily in a plug-pin-plug configuration. The clamp spring 36 is then fitted onto the optical module 41 and the connector plug 21 to sandwich the optical module 41 and the connector plug 21 in between the clamp portions 37 of the clamp spring 36. In this way, the optical module 41 and the connector plug 21 are held together securely under the pressure of the clamp spring 36.

As described above, the fitting of the guide pins 31 into the connector plug 21 and the module body 42 allows not only mechanical connection between these connection parts 21 and 42 but also optical axis alignment between the optical element 81 and the fiber optic cable 22. In other words, the optical element 81 can be optically coupled to the optic fiber 26 with a high degree of precision by a relatively simple method. As the module body 42 has substantially the same shape and dimensions as the MT-connector plug 21, it is possible in the first embodiment to use the guide pins 31 and the clamp spring 36 intended for use in the MT connectors in order to fasten the module body 41 and the connector plug 21 together. The optical module 41 is thus able to attain high optical coupling efficiency general, versatility and cost effectiveness.

Further, the optical element 81 and the IC element 82 are provided in the optical module 41 to reduce the conduction length between the optical element 81 and the IC element 82 and thereby speed up the operations of the optical module 41.

The optical element 81 and the IC element 82 are incorporated in the module body 42 without being exposed at any surface of the optical module 41. It is thus possible to provide secure protection for the optical element 81 and the IC element and to obtain reliability improvements in the optical module 41 as compared to the case where the optical element 81 and the IC element 82 are exposed at a surface of the optical module 41.

The total amount of heat generated in the optical module 41 is relatively large due to the installation of the optical element 81, the IC element 82 and the electronic component or circuit element 83. In addition, the optical element 81, the IC element 82 and the electronic component or circuit element 83 are embedded in the optical module 41. The optical module 41 is thus structurally likely to accumulate therein heat. However, the use of the highly thermal conductive ceramic substrate 51 as a main module body component as well as the placement of the metal piece 72 enables efficient heat diffusion. Some of the bumps 75 also function as thermal paths to promote efficient heat diffusion.

Second Embodiment

The second embodiment will be next explained below with reference to FIGS. 8 and 9.

Figure 8:
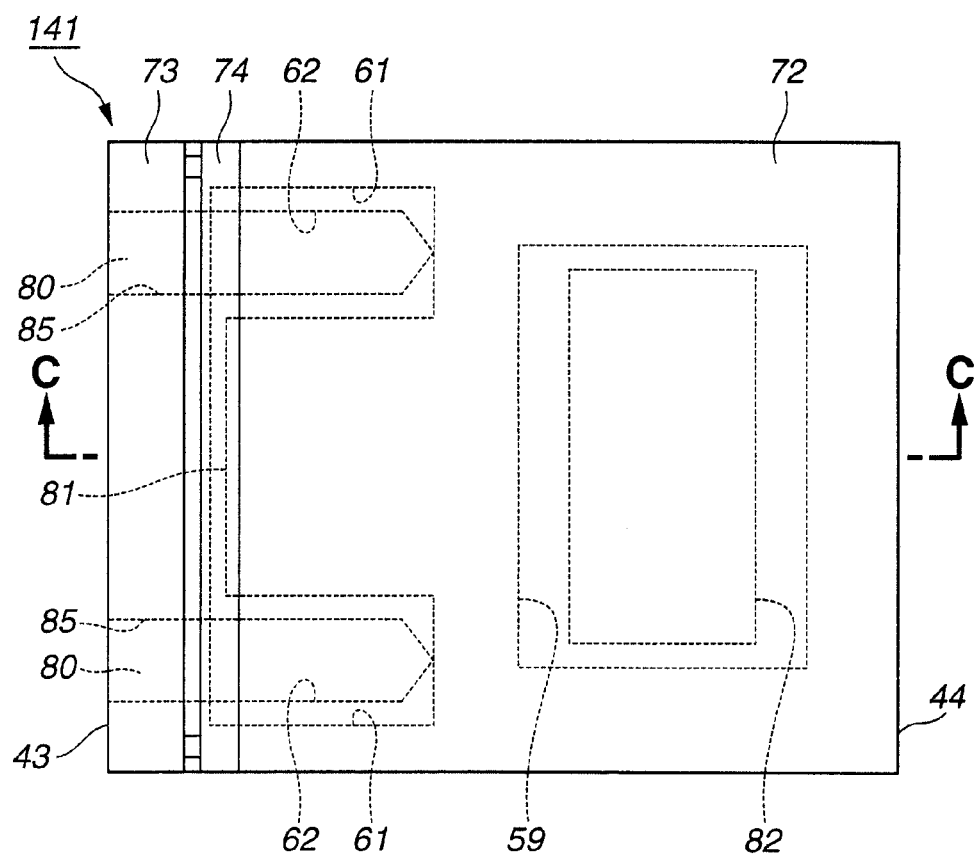
FIG. 8 is a plane view of an optical module according to a second embodiment of the invention.
Figure 9:
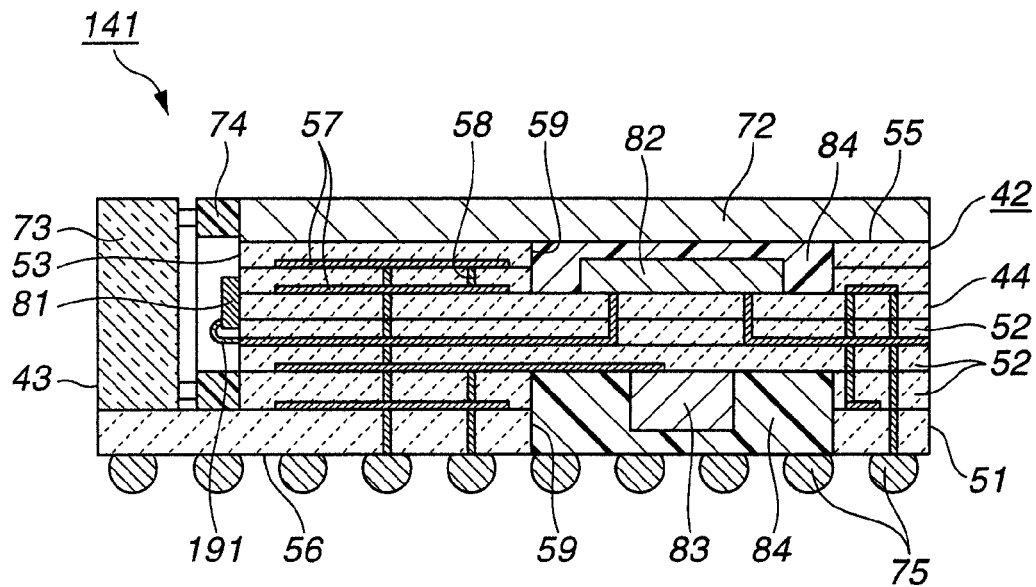
FIG. 9 is a section view of the optical module, when taken along a line C-C of FIG. 8, according to the second embodiment of the invention.

An optical module 141 of the second embodiment is structurally similar to the optical module 41 of the first embodiment, as shown in FIGS. 8 and 9, except that the optical element 81 and the IC element 82 are directly bonded to the ceramic substrate 51 without using the flexible substrate 76 as a support of these elements 81 and 82. More specifically, the optical element 81 is arranged on the side surface 53 of the ceramic substrate 51 and electrically connected to the conductive layer 57 via a bonding wire 191, and the IC element 82 is arranged in the cavity 59 of the main surface 55 of the ceramic substrate 51 and connected electrically to the conductive layer 57 or through-hole conductors 58.

It is accordingly possible in the second embodiment to obtain the same effects as in the first embodiment so that the optical module 141 is able to achieve high optical coupling efficiency, general versatility and cost effectiveness. In addition, the parts count of the optical module 141 can be reduced through the elimination of the flexible substrate 76. This allows a reduction of manufacturing cost of the optical module 141. The optical module 141 is also expected to obtain further improvements in thermal conduction properties, as the thermal conductivity between the ceramic substrate 51 and the metal piece 72 becomes increased by the elimination of the flexible substrate 76.

Third Embodiment

The third embodiment will be explained below with reference to FIGS. 10 and 11.

Figure 10:
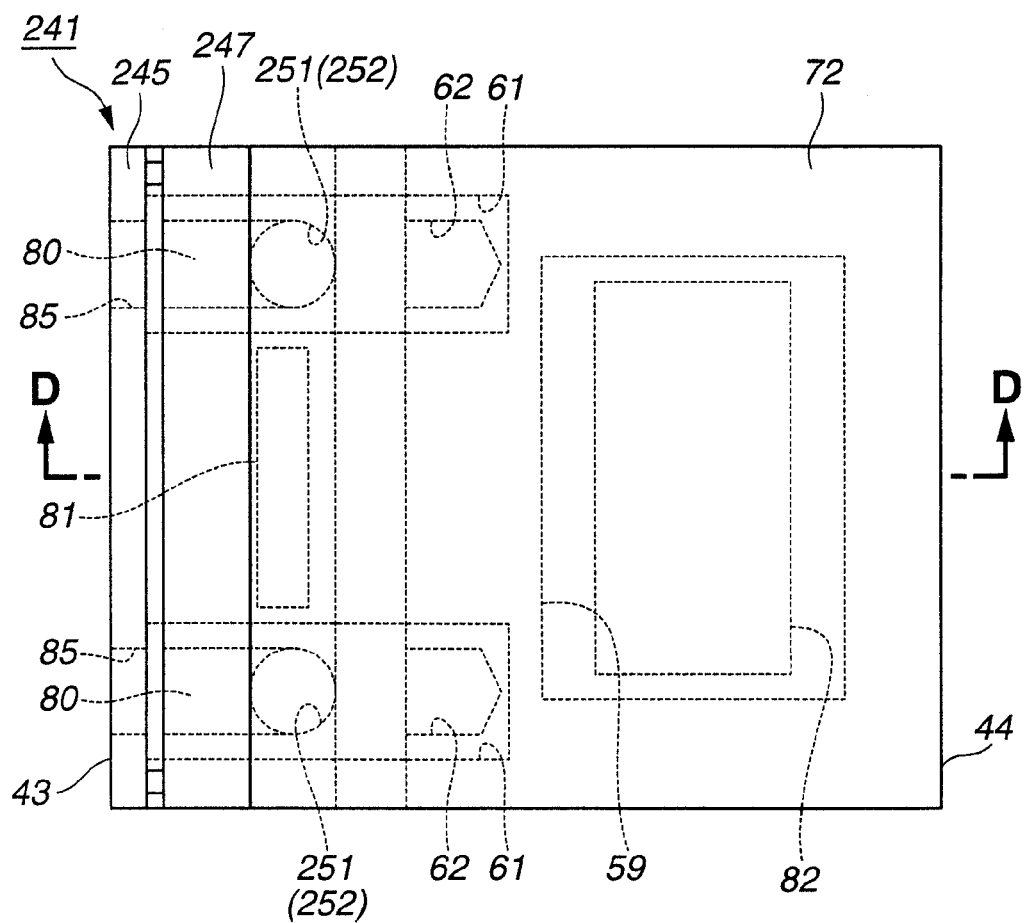
FIG. 10 is a plane view of an optical module according to a third embodiment of the invention.
Figure 11:
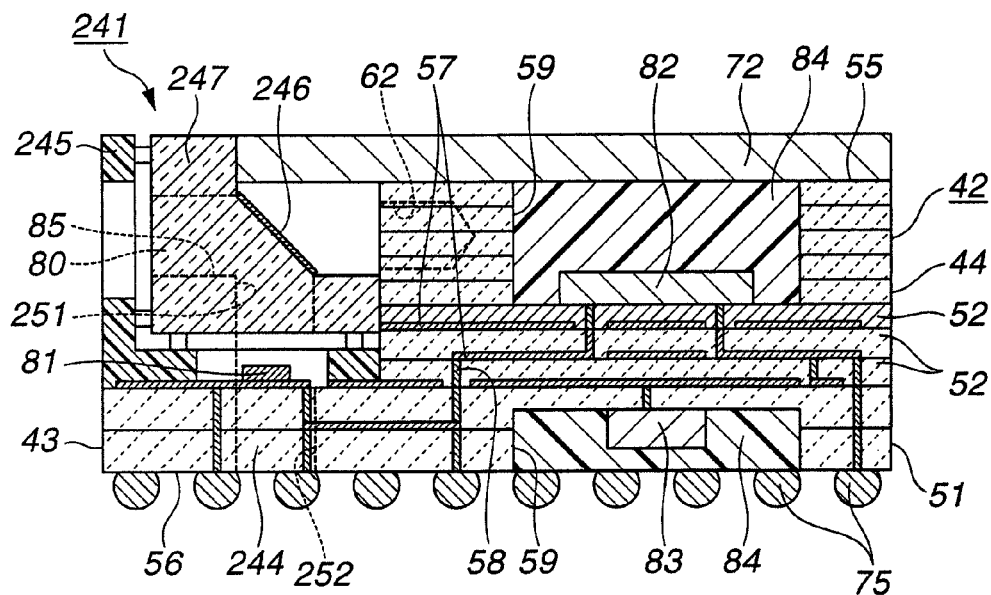
FIG. 11 is a section view of the optical module, when taken along a line D-D line of FIG. 10, according to the third embodiment of the invention.

An optical module 241 of the third embodiment is structurally similar to the optical module 41 of the first embodiment, as shown in FIGS. 10 and 11, except that the optical element 81 and the IC element 82 are directly bonded to the ceramic substrate 51 without using the flexible substrate 76 as a support of these elements 81 and 82. More specifically, the IC element 82 is arranged in the cavity 59 of the main surface 55 of the ceramic substrate 51 and connected electrically to the conductive layer 57 or through-hole conductors 58. In the third embodiment, the ceramic substrate 51 has a thin portion 244 protruding in the X-axis direction along the lower main surface 56 of the ceramic substrate 51. The optical element 81 is arranged on the protruding portion 244 of the ceramic substrate 51, with its light emitting or receiving points directed toward the Z-axis direction (i.e. the upper side of FIG. 11), and electrically connected to the conductive layer 57 or through-hole conductors 58. Further, the optical module 241 includes a spacer 245 and a microlens array 247 with an optical mirror 246. The spacer 245 is L-shaped in cross section and arranged on the protruding portion 244 of the ceramic substrate 51. The microlens array 247 is arranged on the spacer 245 in such a manner that a mirror surface of the optical mirror 246 is angled at 45° with respect to the optical axis. Guide holes 251 and 252 are formed in the microlens array 247 and the protruding portion 244 of the ceramic substrate 55, respectively, along the Z-axis direction, such that the optical element 81 and the microlens array 247 are brought into optical axis arrangement with each other by insertion of guide pins 31 into the guide holes 251 and 252.

It is possible in the third embodiment to obtain the same effects as in the first embodiment so that the optical module 241 is able to achieve high optical coupling efficiency, general versatility and cost effectiveness. As the optical element 81 and the IC element 82 are directed toward the same direction, various module components including the optical element 81 and the IC element 82 can be mounted onto the ceramic substrate 51 more easily and efficiently. The optical module 241 is also expected to obtain further improvements in thermal conduction properties, as the thermal conductivity between the ceramic substrate 51 and the metal piece 72 becomes increased by the elimination of the flexible substrate 76.

Fourth Embodiment

The fourth embodiment will be explained below with reference to FIG. 12.

Figure 12:
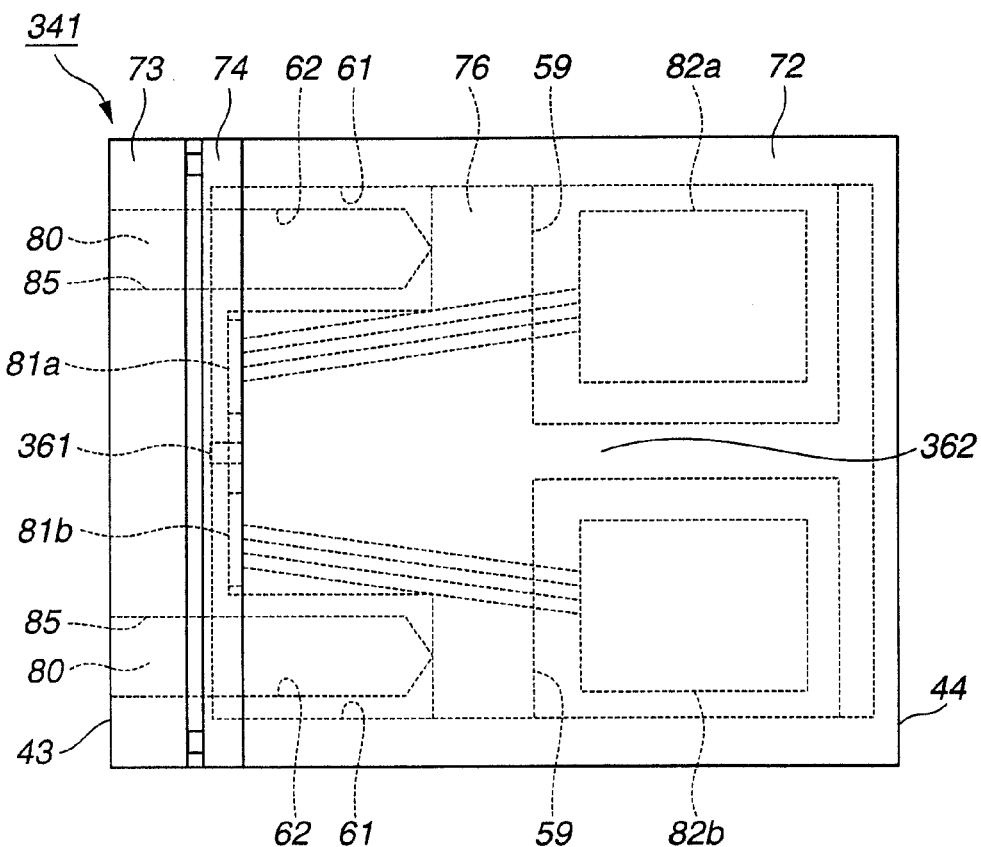
FIG. 12 is a plane view of an optical module according to a fourth embodiment of the invention.

An optical module 341 of the fourth embodiment is structurally similar to the optical module 41 of the first embodiment, as shown in FIG. 12, except that the optical module 341 has two different kinds of optical elements: light-emitting and light-receiving elements 81a and 81b as well as two different kinds of IC elements: driver and receiver ICs 82a and 82b. In the fourth embodiment, the light-emitting and light-receiving elements 81a and 81b are a VCSEL and a photodiode, respectively. The light-emitting element 81a and the driver IC 82a are electrically connected to each other via one wiring pattern of the flexible substrate 76, whereas the light-receiving element 81b and the receiver IC 82b are electrically connected to each other via another wiring pattern of the flexible substrate 76. The module body 42 further includes a shield member 361 arranged between the optical elements 81a and 81b so as to keep the optical elements 81a and 81b electromagnetically separated from each other. In this case, the shield member 361 can be formed by plating any substrate member with a conductive material or by plating the spacer 74 with a conductive material. Two cavities 59 are formed in the upper main surface 55 of the ceramic substrate 51 such that the IC elements 82a and 82b are arranged in the respective cavities 59. Herein, inner surfaces of the cavities 59 are plated with a conductive material. There is a partition wall 362 left between the cavities 59 so as to keep the driver and receiver IC elements 82a and 82b electromagnetically separated from each other.

It is thus possible in the fourth embodiment to obtain the same effects as in the first embodiment so that the optical module 341 is able to attain high optical coupling efficiency, general versatility and cost effectiveness as well as high added values.

Modifications of First to Fourth Embodiments

Various modifications may be made to the above first to fourth embodiments.

For instance, the module body 42 and the connector plug 21 may alternatively be connected together in a plug-pin-plug configuration through the use of the guide pins 31 only (i.e. without the use of the clamp spring 36) although these connection parts 42 and 21 are coupled through the use of both the guide pins 31 and the clamp spring 36 in the first to fourth embodiments.

The spacer 74 or 245 may be eliminated to reduce the parts count of the optical module 41, 141 or 241 in the first, second or third embodiment.

Although the ceramic substrate 51, the microlens array 247 and the metal piece 72 are aligned and fixed by means of the guide pins 31 in the third embodiment, the ceramic substrate 51, the microlens array 247 and the metal piece 72 may alternatively be aligned and fixed by e.g. adhesion bonding without the use of the guide pins 31.

A plurality of metal pieces 72 may be provided in the module body 42 although a single metal piece 72 is provided in the main surface of the module body 42 in the first to fourth embodiments.

In the first to fourth embodiments, projections and depressions are not formed on inner surfaces of the recesses 61, and the diameter of each circular recess 61 is substantially constant throughout its depth. However, projections and depressions may alternatively be formed on the inner surfaces of the recesses 61 in such a manner that the diameter of each recess 61 varies with depth. In this case, the contact surface between the recess 61 and the filler 63 becomes increased so as to improve adhesion of the filler 63 to the recess 61, prevent the occurrence of a gap between the recess 61 and the filler 63 and cracks due to thermal stress concentration and thereby allow improvements in reliability.

The precision apertures 62 are formed by packing the fillers 63 into the recesses 61, semi-hardening the fillers 63 at 120° C., precision drilling, surface polishing and then hardening the fillers 63 completely at 150° C. in the first embodiment. Alternatively, the apertures 62 can be formed by another process, e.g., packing the fillers 63 into the recesses 61, semi-hardening the fillers 63 at 120° C., surface polishing, hardening the fillers 63 completely at 150° C. and then precision drilling.

Fifth Embodiment

The fifth embodiment will be next explained below with reference to FIGS. 13 to 21.

Figure 13:
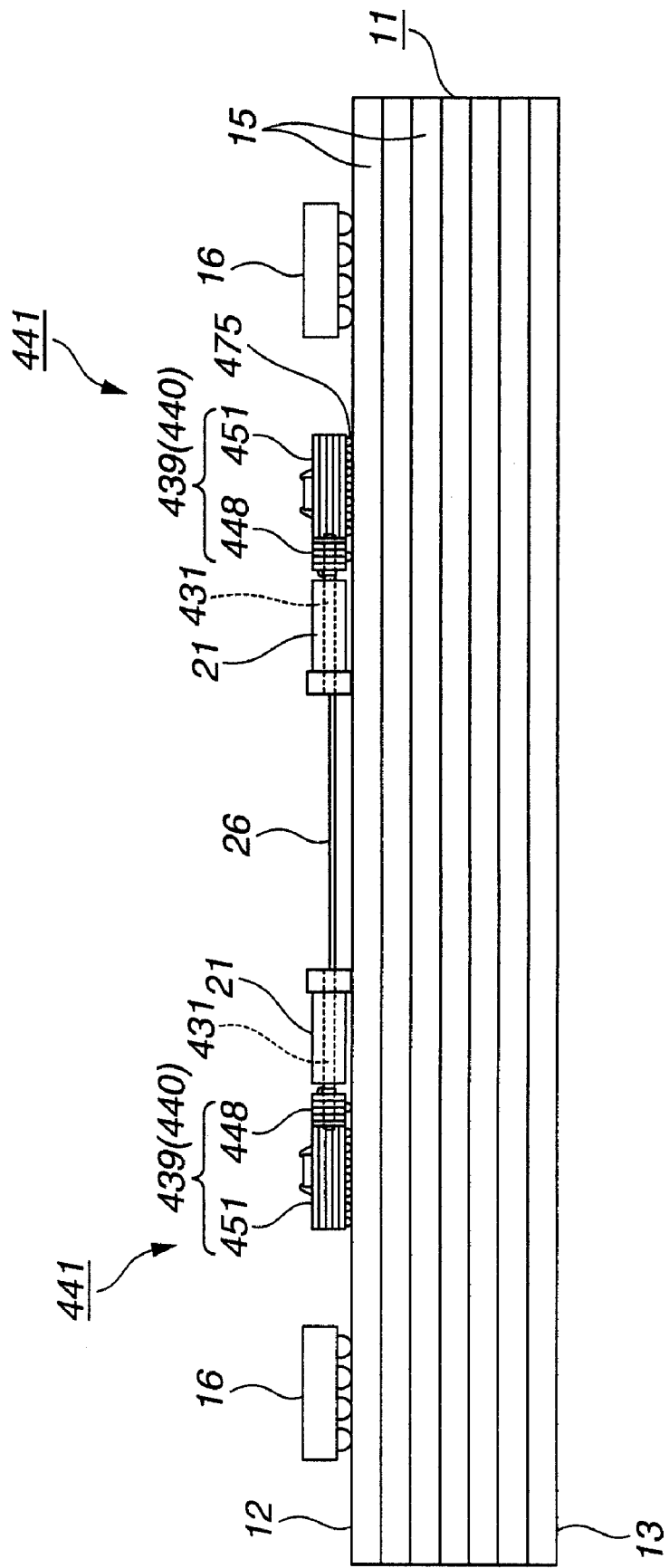
FIG. 13 is a front view of an optical coupling structure in which an optical module is mounted on a printed circuit board and coupled to a fiber optic cable via an MT connector according to a fifth embodiment of the invention.

As shown in FIG. 13, two optical modules 441 are mounted on a printed circuit board 11 via bump contacts 475 and connected to each other though a fiber optic cable 26. It is noted that the fiber optic cable 26 is used as a counterpart optical device in the fifth embodiment. The printed circuit board 11 has a plurality of insulating layers 15 and conducting layers alternately laminated together to define two opposite main surfaces 12 and 13. Although not shown in the drawings, pads are arranged on the main surface 12 of the printed circuit board 11 for electrical connections to the optical modules 441. IC chips 16 are also mounted on the printed circuit board 11 via bump contacts.

Figure 14:
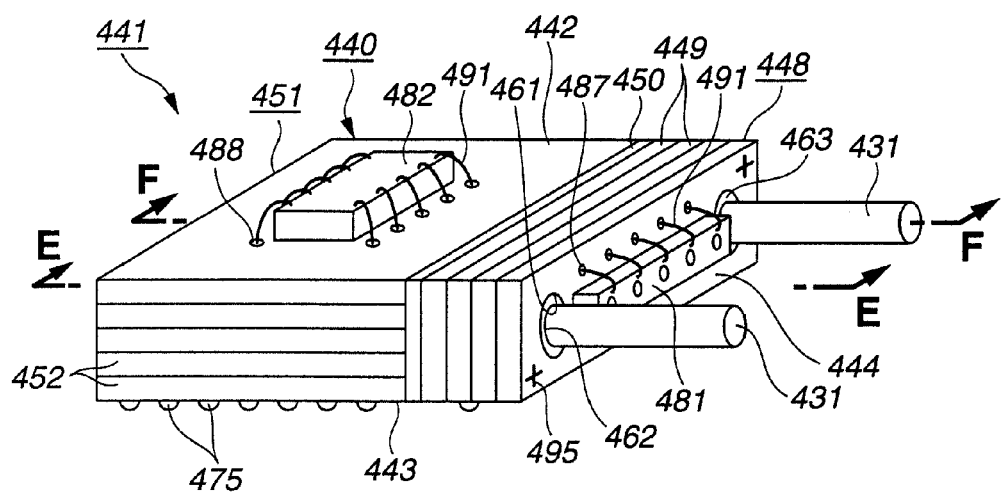
FIG. 14 is a perspective view of the optical module according to the fifth embodiment of the invention.
Figure 15:
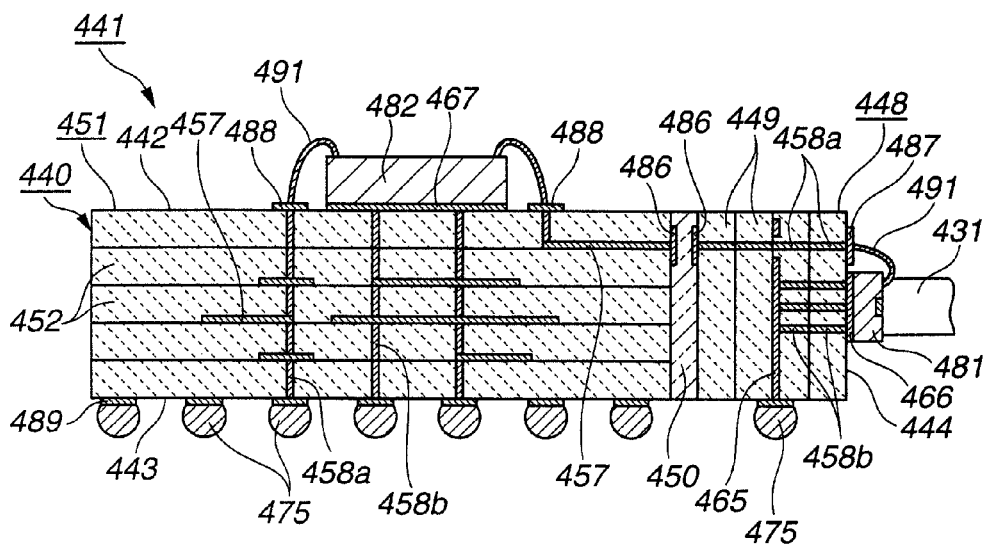
FIG. 15 is a section view of the optical module, when taken along a line E-E of FIG. 14, according to the fifth embodiment of the invention.

Each of the optical modules 441 is secured to a connector plug 21 of the fiber optic cable 26, and includes a module body 439 having a substrate 440 as a main module body component and an optical element 481 mounted to a mounting portion 466 of the substrate 440 with an optical face thereof directed toward a mating face of the connector plug 21 as shown in FIGS. 13 to 15.

Figure 16:
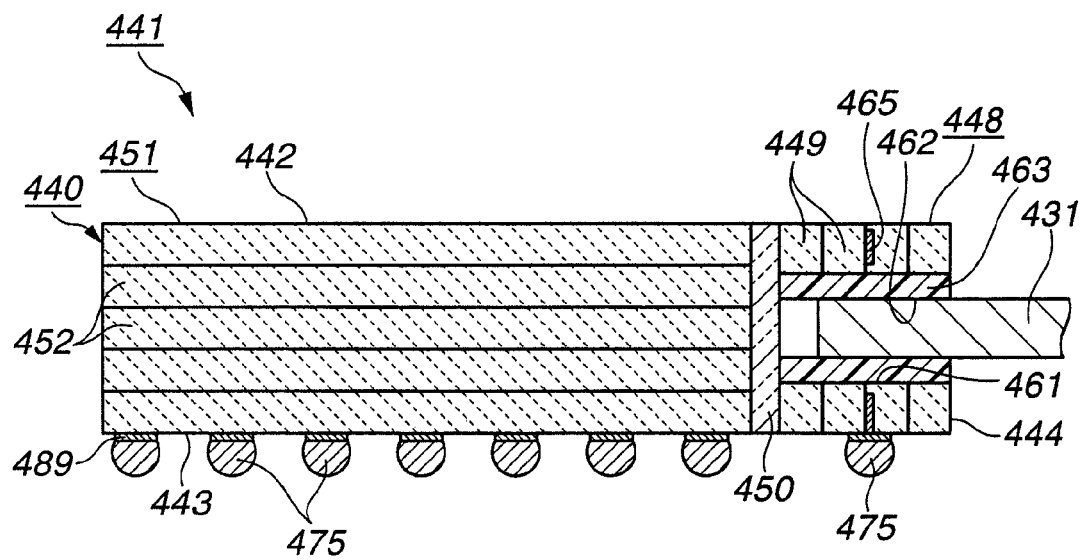
FIG. 16 is a section view of the optical module, when taken along a line F-F of FIG. 14, according to the fifth embodiment of the invention.

The substrate 440 is flat in shape to define two opposite main surfaces 442 and 443, as shown in FIGS. 14 to 16. In the fifth embodiment, the substrate 440 is preferably in the form of a joint substrate of first and second laminated substrate members 448 and 451.

The first substrate member 448 has a plurality of insulating layers 449 laminated together and a solid ground layer 465 formed between the insulating layers 449, whereas the second substrate member 451 has a plurality of insulating layers 452 and conducting layers 457 alternately laminated together. Conducting layers may be provided between the insulating layers 449 in the first substrate members 448 although not specifically shown in the drawings. Further, the first and second substrate members 448 and 451 have via-hole conductors 458a and 458b formed therein to establish a circuit pattern together with the conducting layers 457 and the ground layer 465. As shown in FIG. 15, a through hole is formed in the ground layer 465 such that the via-hole conductor 458a passes through the through hole.

These laminated substrate members 448 and 451 are joined to each other in such a manner that the direction of lamination of the insulating layers 449 in the first substrate member 448 is substantially perpendicular to the direction of lamination of the insulating layers 452 in the second substrate member 451. Preferably, the first substrate member 448 is made smaller in size than the second substrate member 451 and joined at one substrate face thereof to a side face of the second substrate member 451 such that the insulating layers 449 and 452 of the substrate members 448 and 451 are laminated in the plane and thickness directions of the substrate 440, respectively. (Hereinafter, the substrate face of the first substrate member 448 and the side face of the second substrate member 451 at which the substrate members 448 and 451 are joined together may be occasionally referred to as joint faces.) It should be noted that the layer lamination directions of the substrate members 448 and 451 may not form an exact 90° angle but forms substantially a 90° angle.

Each of the insulating layers 449 and 452 is made of an electrically insulating material such as a resin or ceramic.

The use of a resinous material as the insulating layers 449 and 452 allows a cost reduction of the substrate 440. Examples of the resin usable as the insulating layers 449 and 452 include an epoxy (EP) resin, a polyimide (PI) resin, a bismaleimide-triazine (BT) resin and a polyphenylether (PPE) resin. A core substrate material of these resinous insulating layers may be combined with a build-up layer or layers.

The use of a ceramic material as the insulating layers 449 and 452 allows good optical transmission efficiency without causing a deterioration in optical coupling due to the generation of heat from the optical element 481, because the ceramic material has not only high stiffness and dimensional stability but also good thermal conduction properties to efficiently diffuse heat to the outside. The substrate 440 of ceramic laminated material is thus especially useful as a support of the optical element 481. Examples of the ceramic usable as the insulating layers 449 and 452 include alumina, beryllia, mullite, aluminium nitride, silicon nitride, boron nitride and silicon carbide. These ceramic materials have superior thermal conduction properties.

Especially when the insulating layers 449 and 452 are made of ceramic e.g. alumina in the fifth embodiment, it is preferable that the substrate members 448 and 451 make no direct surface contact with each other. The substrate 440 may thus preferably include a heat insulation layer 450 between the substrate members 448 and 451 to join the substrate members 448 and 451 together through the heat insulation layer 450. In order to prevent heat transfer from between the substrate members 448 and 451 and thereby thermally protect the optical element 481 for operation stability of the optical module 441, the heat insulation layer 450 is made of a material having a lower thermal conductivity than that of the ceramic material of the insulating layers 449 and 452. In the fifth embodiment, the heat insulation layer 450 is made of an anisotropic conductive material such that the substrate members 448 and 451 are mechanically and electronically connected to each other via the anisotropic layer 450.

When the first substrate member 448 is joined at one substrate face thereof to the side face of the second substrate member 451 as shown in FIGS. 14 to 16, it is preferable to mount the optical element 481 on the other substrate face of the first substrate member 448, i.e., on the side surface 444 of the substrate 440 (or the module body 39) defined by the first substrate member 448, so as to establish an optical coupling between the optical element 481 and the optic cable 26 without the need for an optical path conversion device. (Hereinafter, the substrate face 444 of the first substrate member 448 on which the optical element 481 is mounted may be occasionally referred to as an optical element mounting face.) This allows a cost reduction and a low profile of the optical module 441 advantageously.

The optical element 481 is a light-emitting element capable of converting electrical signals into optical signals and emitting the optical signals to a specific area, or a light-receiving element capable of receiving optical signals and converting the optical signals into electrical signals. Examples of the light-emitting element include a light emitting diode (LED), a laser diode (LD) and a vertical cavity surface emitting laser (VCSEL). Examples of the light-receiving element include a pin photo diode (pin PD) and an avalanche photo diode (APD). The optical element 481 can be made of a suitable material, such as Si, Ge, InGaAs, GaAsP and GaAlAs.

It is noted that, in the fifth embodiment, one of the optical modules 441 (located on the right side of FIG. 13) is of surface emitting type in which the optical element 481 is a surface emitting laser: VCSEL, and the other of the optical modules 441 (located on the left side of FIG. 13) is of surface receiving type in which the optical element 481 is a surface receiving photodiode.

The optical module 441 may additionally include an IC (integrated circuit) element 482 supported on a mounting portion 467 of the substrate 440 to drive the optical element 481 upon transmission of the electrical signals from the printed circuit board 11 to the optical element 481, or to receive and amplify the electrical signals from the light-receiving optical element 481. Namely, the IC element 482 is an integrated circuit for driving the optical element 481 (so called "driver IC") when the optical element 481 is a light-emitting element. When the optical element 481 is a light-receiving element, the IC element 482 is an integrated circuit for amplifying the electrical signals (so called "receiver IC"). Similar to the first to fourth embodiments, the arrangement of the IC element 482 in the optical module 441 allows a reduction of conduction length between the optical element 481 and the IC element 482 so as to increase the operating speed of the optical module 441 as compared to the case where the optical element 481 is connected with an IC element external to the optical module 441 in the fifth embodiment.

Although the IC element 482 can be mounted on either the first substrate member 448 or the second substrate member 451, it is preferable to mount the IC element 482 on one substrate face of the second substrate member 451 (i.e. the main surface of the substrate 440 defined by the second substrate member 451) when the first substrate member 448 is joined at one substrate face thereof to the side face of the second substrate member 451. (Hereinafter, the substrate surface of the second substrate member 451 on which the IC element 482 is mounted may be occasionally referred to as an IC element mounting face.) In other words, it is preferable to mount the optical element 481 on one of the first and second substrate members 448 and 451 and to mount the IC element 482 on the other of the first and second substrate members 448 and 451. If both of the optical element 481 and the IC element 482 are mounted on either one of the first and second substrate members 448 and 451, these elements 481 and 482 get physically close to each other so that the optical element 481 is prone to thermal and electromagnetic effects from the IC element 482. In addition, it is difficult to secure a space for mounting two elements 481 and 482 and thereby difficult to achieve the total size reduction of the optical module 441 if the optical element 481 and the IC element 482 are mounted on either one of the substrate members 448 and 451.

The optical module 441 may also include an electronic component or circuit element other than the optical element 481 and the IC element 482 although not shown in the drawings. In order to secure a space for mounting the electronic component or circuit element with ease and to prevent the electronic component or circuit element from being thermally and electromagnetically effected by the optical element 481, the electronic component or circuit element is preferably mounted on the second substrate member 451 rather than mounted on the first substrate member 448. Examples of the electronic component include a chip transistor, a chip diode, a chip resistor, a chip capacitor and a chip inductor. Examples of the circuit element include a thin film transistor, a thin film diode, a thin film resistor, a thin film capacitor and a thin film inductor. This element may be active or passive. Especially when the electronic component or circuit element is a capacitor, it is possible to reduce resistance and inductance in the optical module 441 and then enhance the performance of the optical module 441.

Connection pads 486 are formed on the opposed joint faces of the substrate members 448 and 451 and electrically conducted to each other through the anisotropic conductive material of the heat insulation layer 450 as shown in FIGS. 15 and 16. As shown in FIGS. 14 and 15, bonding pads 487 are formed on the optical element mounting face 444 of the first substrate member 448 (opposite to its joint substrate face) around the optical element mounting portion 466 for connections to the terminals of the optical element 481 via bonding wires 491. Further, bonding pads 488 are formed on the IC element mounting face of the second substrate member 451 around the IC element mounting portion 467 for connections to the terminals of the IC element 482 via bonding wires 491 as shown in FIGS. 14 and 15. The optical element 481 and the IC element 482 are thus electrically connected to each other via the conducting layers 457, the via-hole conductors 458a, the pads 486, 487 and 488 and the bonding wires 491 even though these elements 481 and 482 are mounted on the separate substrate members 448 and 451.

Bump pads 489 are also provided to the lower main surface of the substrate 440 over the substrate members 448 and 451 such that the bump contacts 475 are provided on the respective bump pads 489.

Further, it is preferable to provide separate thermal conduction paths in the substrate members 448 and 451 so as to diffuse heat from the optical element 481 and the IC element 482 to the outside of the optical module 441 without causing heat transfer between the part of the first substrate member 448 and the part of the second substrate member 451. In the fifth embodiment, the via-hole conductors 458b serve as thermal vias so as to diffuse heat from these elements 481 and 482 to the outside of the optical module 441. The ground layer 465 also has the function of transferring heat from the optical element 481 to the outside of the optical module 441 efficiently because of its solid form. Each of the optical element mounting portion 466 and the IC element mounting portion 467 is herein made of a conductive material in the fifth embodiment. It is thus possible to diffuse the heat from the optical element 481 to the printed wiring board 11 through the optical element mounting portion 466, the via-hole conductors 458b, the ground layer 465, the bump pads 489 and then the bump contacts 475 and to diffuse heat from the IC element 482 to the printed wiring board 11 through the IC element mounting portion 467, the via-hole conductors 458b, the bump pads 489 and then the bump contacts 475, without heat transfer between the part of the first substrate member 448 and the part of the second substrate member 451, e.g. when the IC element 482 generates a larger amount of heat than the optical element 481.

As shown in FIG. 14, an alignment mark 495 is formed on the optical element mounting face 444 of the first substrate member 448 for convenience of alignment. In the fifth embodiment, the alignment mark 495 is in the shape of a cross.

The optical module 441 further includes an optical coupling member or members 431 as a guide for optical axis alignment of the optical element 481 with the optical device 26. In order to attain high alignment accuracy and coupling strength, it is preferable to provide a plurality of optical coupling members 431 in the optical module 441. For a lower profile of the optical module 441, it is further preferable that the optical coupling members 431 and the optical element 481 are located on the first substrate member 448, more particularly on the same substrate face of the first substrate member 448, e.g. in such a manner that the optical element 481 is arranged between the optical coupling members 431. The shape and material of the optical coupling member or members 431 are not particularly restricted. The optical coupling member 431 is preferably in the form of a pin made of a metal having some hardness.

In the fifth embodiment, two guide pins 431 are used as the optical coupling members as shown in FIGS. 13 to 16. These guide pins 431 are inserted and fitted in guide holes of the first substrate member 448 so as to protrude from the side surface of the substrate 440 and extend in the plane direction, whereby the optical module 441 attains a low profile without an increase in thickness.

It is preferable that the diameter of each guide pin 431 and each guide hole of the substrate 440 is substantially the same as that of alignment pin holes in the connector plug 21 of the counterpart optical device 26 in order to engage the guide pins 431 into the alignment holes of the counterpart optical device 26 and into the guide holes of the substrate 440 properly.

In view of the general versatility, the connector plug 21 and the guide pins 431 can be a plug and guide pins designed for an MT connector. In this case, the alignment holes of the connector plug 21 and the guide holes of the substrate 440 are made with a diameter of 0.7±0.001 mm and a hole-to-hole pitch of 4.6±0.003 mm according to JIS C 5981. Further, there may be used as the guide pins 431 "CNF125A-21" having a diameter of 0.699 mm according to JIS C 5981.

The guide holes of the substrate 440 are preferably formed by precision machining. Especially when the first substrate member 448 is a laminated ceramic substrate member, it is preferable to form the guide holes in the first substrate member 448 by cutting circular recesses 461 through the substrate member 448, packing fillers 463 into the recesses 461, and then, making apertures 462 through the fillers 463 by precision machining such that these apertures 462 are open at both the substrate faces of the first substrate member 448 so as to constitute the guide holes. When the guide holes are formed by precision machining, the optical axis alignment between the optical element 481 and the fiber optic cable 26 can be achieved more easily and properly by insertion of the guide pins 431 into such precisely machined holes. This allows assured improvements in optical coupling efficiency.

Preferably, the filler 463 is lower in hardness and better in machinability than the ceramic substrate member 448. Since the ceramic substrate member 448 has not only the advantages of good thermal conduction properties and high dimensional stability but also the disadvantages of high hardness and poor machinability, it would be difficult and costly to form apertures by precision machining directly in the ceramic substrate member 448. By contrast, the guide holes 462 can be easily formed in the good machinable fillers 463 at lower cost. These apertures 462 can be formed by any precision machining method such as drilling, punching or laser machining. In view of the cost, the apertures 462 are preferably drilled by the use of a precision drill. Examples of the fillers 463 include a resinous material, a metal material and a glass material. Among others, the resinous material is preferably used as the filler 463. The resinous material is generally lower in hardness and price than the ceramic material, so that the use of such a low-hardness, low-priced resinous material as the filler 463 allows a reduction of not only manufacturing labor cost but also material cost.

The manufacturing method of the optical module 441 will be next explained below.

Figure 19:
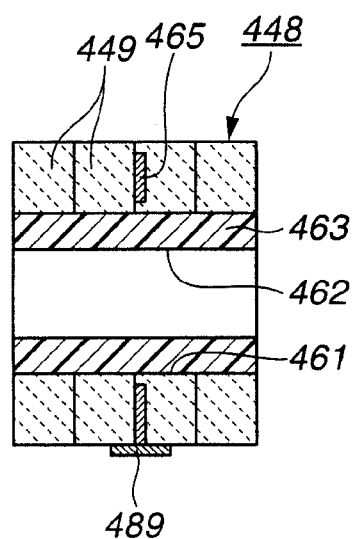

The first substrate member 448 is first produced by e.g. the following procedure as shown in FIG. 19.

A raw slurry material is prepared by mixing and kneading various ingredients such as alumina powder, organic binder, solvent and plasticizer uniformly. The prepared slurry material is subjected to sheet forming with a doctor blade, thereby yielding a plurality of green sheets of a given thickness. Holes are formed through the green sheets by punching in specified positions, and metal paste such as tungsten paste is filled in the respective holes. Metal paste such as tungsten paste is printed on surfaces of the green sheets. The green sheets are laminated together and pressed under a given pressure to obtain a green sheet laminate. Further, metal paste such as tungsten paste is printed on a surface of the green sheet laminate. The green sheet laminate is then subjected to drilling to cut the recesses 461 through the green sheet laminate. As the sheet laminate is still green at this point, the recesses 461 can be easily formed at lower cost. The thus-obtained green sheet laminate is dried and degreased by known processes and sintered at temperatures (e.g. 1650 to 1950° C.) sufficient for the sintering of alumina, thereby forming the laminated ceramic substrate member 448. In the thus-formed substrate member 448, the insulating layers 449, the ground layer 465 and the conducting layers, the optical element mounting portion 466 and the bonding pads 486 and 487, the bump pads 489, and the via-hole conductors 458a and 458b are made up of the green sheets, the metal paste printed on surfaces of the green sheets, the metal paste printed on the green sheet laminate and the metal paste filled in the holes, respectively.

The fillers 463 are prepared by mixing an epoxy resin, a curing agent and a silica filler etc. and then kneading the thus-obtained mixture with a three-roll kneader. After packing the fillers 463 in the respective recesses 461 of the first substrate member 448 by a known process such as print process, the first substrate member 448 is heated at 120° C. for 1 hour such that the fillers 463 get semi-hardened. The fillers 463 are not completely hardened at this point for ease of the following hole making process.

The apertures 462 are formed in the semi-hardened fillers 463, respectively, using a precision drill. By such precision machining process, the apertures (guide holes) 462 can be made easily and properly as an accurate positional reference for optical axis alignment. Further, the formation of the precision apertures 462 in the resinous fillers 463 allows reductions in processing and labor cost as a cost-cutting measure for the optical module 441.

The thus-obtained substrate member 448 is heated at 150° C. for 5 hours such that the fillers 463 get hardened completely. Then, the substrate member 448 is subjected to finishing by a known process to make a fine adjustment of the diameter of the precision apertures 462 to 0.700 mm accurate to ±0.001 mm.

Figure 17:
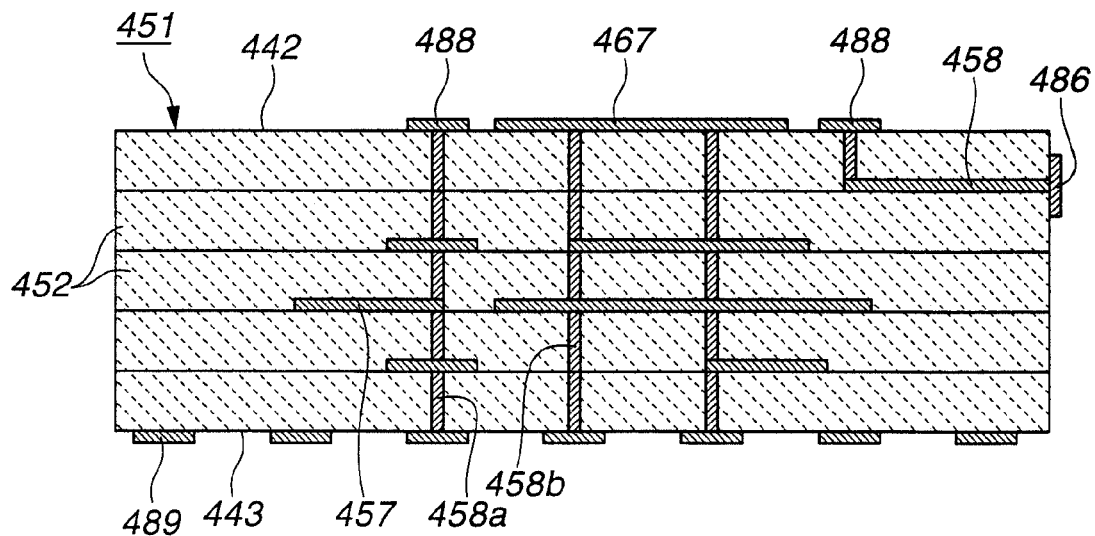
FIGS. 17 to 21 are section views showing how to manufacture the optical module according to the fifth embodiment of the invention.

The second substrate member 451 is next produced by e.g. the following procedure as shown in FIG. 17.

The same slurry material as used in the production of the first substrate member 448 is prepared and subjected to sheet forming with a doctor blade, thereby yielding a plurality of green sheets of a given thickness. Holes are formed through the green sheets by punching in specified positions, and metal paste such as tungsten paste is filled in the respective holes. Metal paste such as tungsten paste is printed on surfaces of the green sheets. The green sheets are laminated together and pressed under a given pressure to obtain a green sheet laminate. Further, metal paste such as tungsten paste is printed on a surface of the green sheet laminate. The thus-obtained green sheet laminate is dried, degreased and sintered by known processes, thereby forming the laminated ceramic substrate member 451. In the thus-formed substrate member 451, the insulating layers 452, the conducting layers 457, the IC element mounting portion 467 and the bonding pads 486 and 488, the bump pads 489 and the via-hole conductors 458a and 458b are made up of the green sheets, the metal paste printed on surfaces of the green sheets, the metal paste printed on the green sheet laminate and the metal paste filled in the holes, respectively.

Figure 20:
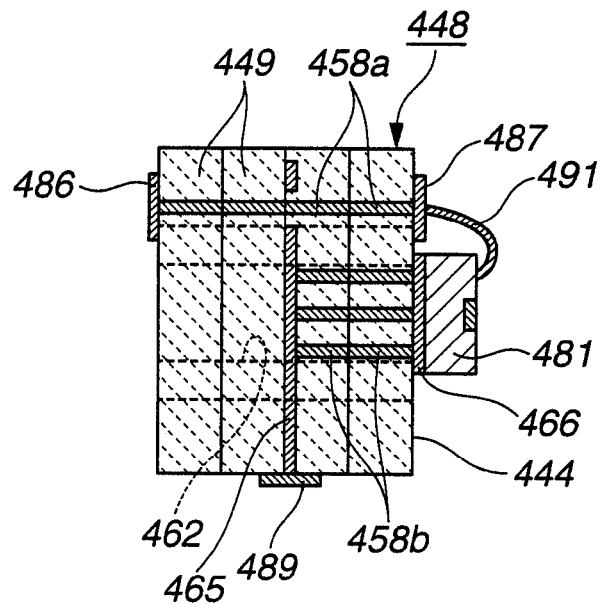

Subsequently, the optical element 481 is mounted on the first substrate member 448, as shown in FIG. 20, by setting the substrate member 448 in a chip mounter in such a manner the optical element mounting face 444 of the substrate member 448 is held in a face up position, and then, bonding the optical element 481 to the optical element mounting portion 466 using an adhesive. The alignment mark 495 may be used for parts alignment. Upon setting the substrate member 448 in a bonding device in such a manner that the optical element mounting face 444 of the substrate member 448 is held in a face up position, the bonding wires 491 are then provided to establish electrical connections of the optical element 481 to the conductive members 458b and 487.

Figure 18:
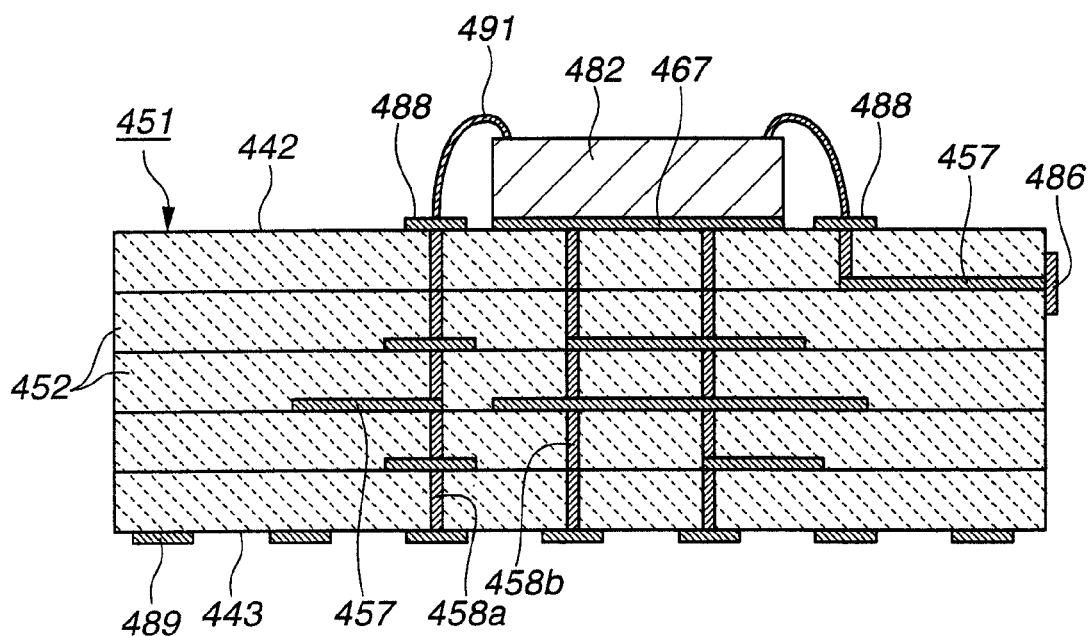

The IC element 482 is then mounted on the second substrate member 451, as shown in FIG. 18, by setting the substrate member 451 in a chip mounter in such a manner that the IC element mounting face of the substrate member 451 is held in a face up position, and then, bonding the IC element 482 to the IC element mounting portion 467 using an adhesive. Upon setting the substrate member 451 in a bonding device in such a manner that the IC element mounting face of the substrate member 451 is held in a face up position, the bonding wires 491 are then provided to establish electrical connections of the IC element 482 to the conductive members 458b and 488.

In this way, each of the optical element mounting face 444 of the first substrate member 448 and the IC element mounting face of the second substrate member 451 is in a face up position during the adhering and wire bonding processes so that these adhering and wire bonding processes can be done relatively easily.

Figure 21:
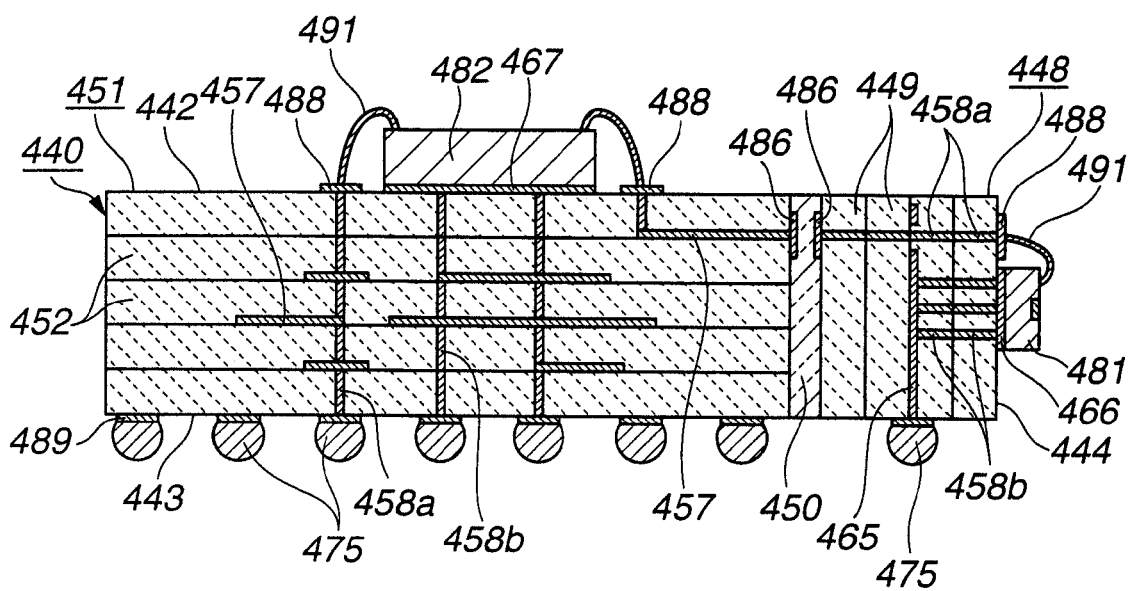

The first and second substrate members 448 and 451 are mechanically and electronically coupled to each other, as shown in FIG. 21, by arranging the film 450 of anisotropic conductive material between the substrate members 448 and 451, applying a pressure in such a manner as to hold the anisotromipic film 450 between the substrate members 448 and 451, and then, heating the anisotromipic film 450 to a given temperature. In the thus-obtained joint substrate 440, the lamination direction of the insulating layers 449 in the first substrate member 448 is substantially perpendicular to the lamination direction of the insulating layers 452 in the second substrate member 451.

The guide pins 431 are inserted and fitted in the precision holes 462 of the substrate 440 in such a manner that the guide pins 43 have respective portions protruding from the substrate 440. After that, the solder bumps 475 are provided on the bump pads 489 and subjected to reflowing at a given temperature for a certain time period, thereby mounting the optical module 441 onto the printed wiring board 11. Alternatively, the guide pins 431 may be fitted in the substrate 440 after mounting the optical module 441 on the printed wiring board 11.

Finally, the optical module 441 is coupled to the connector plug 21 of the fiber optic cable 26. The optical axis alignment between the optical module 441 and the fiber optic cable 26 can be easily attained upon insertion of the protruding portions of the guide pins 431 into the alignment holes of the plug 21.

As described above, the use of the guide pins 431 as a positional reference or in the optical module 441 allows easy optical axis alignment of the optical element 481 with the optical device 26. The optical element 481 can be thus optically coupled to the optical device 26 with a high degree of precision, thereby allowing efficient optical coupling.

The joint substrate 440 of the first and second laminated substrate members 448 and 451 is structurally adapted to support the optical element 481 and the guide pins 431 on the side surface of the substrate 440 and to support the IC element 482 on the main surface of the substrate 440. It is thus possible to minimize the thickness dimension of the optical module 441 for a lower profile of the optical module 441.

For the production process of the substrate 440, the substrate members 448 and 451 are prepared at separate steps without the need to process the substrate 440 into a complicated three-dimensional shape as in the earlier technology. The substrate 440 can be produced relatively easily at a lower cost.

The first and second substrate members 448 and the 451 are electrically connected to each other in the substrate 440 such that the optical element 481 and the IC element 482 can be supported on the separate substrate members 448 and 451. Further, a circuit pattern can be advantageously formed throughout the substrate 440. It is thus possible to make full use of the whole of the substrate 440 without a waste of space. This allows a size reduction of the optical module 441.

As the first and second substrate members 448 and 451 are mainly composed of ceramic, the optical module 441 is able to achieve high stiffness and dimensional stability and good thermal conduction properties. It is thus possible to prevent the occurrence of problems in the optical module 441 (such as a deterioration in optical coupling accuracy due to the influence of heat on the optical element 481) and to achieve efficient optical transmission.

Sixth Embodiment

The sixth embodiment will be next explained below with reference to FIGS. 22 and 23.

Figure 22:
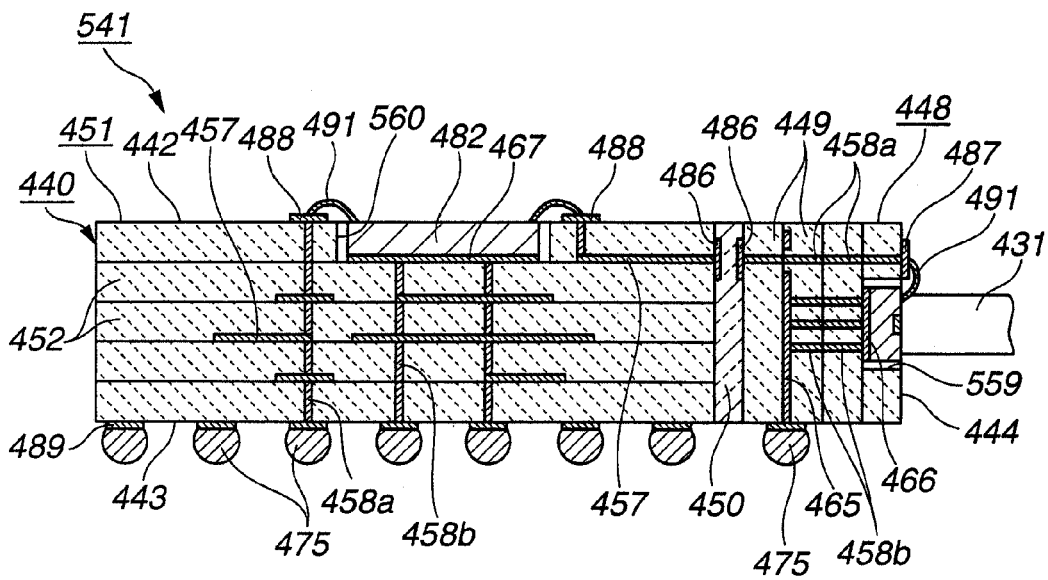
FIG. 22 is a section view of an optical module according to a sixth embodiment of the invention.
Figure 23:
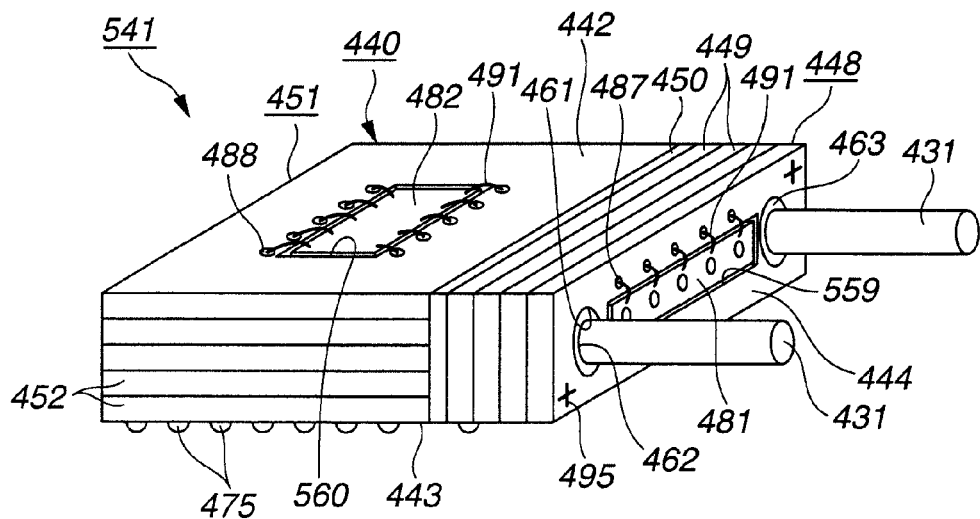
FIG. 23 is a perspective view of the optical module according to the sixth embodiment of the invention.

An optical module 541 of the sixth embodiment is structurally similar to the optical module 441 of the fifth embodiment, as shown in FIGS. 22 and 23, except for the arrangement of the optical element 481 and the IC element 482. More specifically, cavities 559 and 560 are formed in the optical element mounting face 444 of the first substrate member 448 and the IC element mounting face of the second substrate member 451 such that the optical element 481 and the IC element 482 are arranged in the cavities 559 and 560 of the substrate members 448 and 451, respectively. This arrangement allows the optical element 481 and the IC element 482 to be less protruded from the substrate 440, whereby the optical module 541 achieves a lower profile. Further, the bonding wires 491 from the optical element 481 to the bonding pads 487 and from the IC element 482 and the bonding pads 488 can be shortened so as to speed up the operations of the optical module 541.

Seventh Embodiment

The seventh embodiment will be explained below with reference to FIG. 24.

Figure 24:
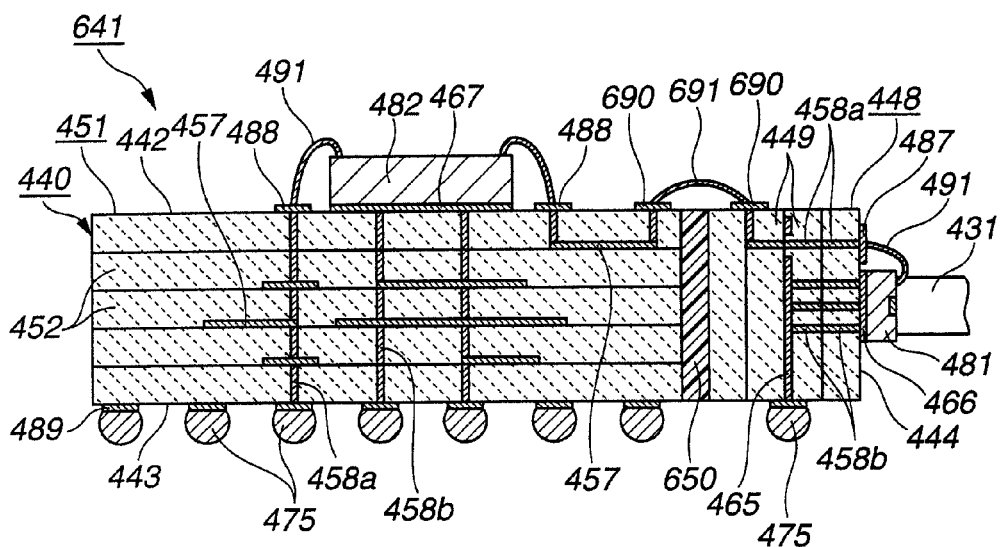
FIG. 24 is a section view of an optical module according to a seventh embodiment of the invention.

An optical module 641 of the seventh embodiment is structurally similar to the optical element 441 of the fifth embodiment, as shown in FIG. 24, except that the first and second substrate members 448 and 451 are joined together with an adhesive layer 650. The adhesive layer 650 is of an organic resin adhesive, such as an epoxy resin adhesive, having heat insulation properties such that the adhesive layer 650 functions as a heat insulation layer. No connection pads 486 are provided to the joint faces of the substrate members 448 and 451 the sixth embodiment. Instead, bonding pads 690 are provided on the upper faces of the substrate members 448 and 451, and bonding wires 691 are provided between the bonding pads 690 to allow electrical connection between the first and second substrate members 448 and 451. Even in such an arrangement, the first and second substrate members 448 and 451 can be mechanically and electrically connected to each other.

Eighth Embodiment

Finally, the eighth embodiment will be explained below with reference to FIG. 25.

Figure 25:
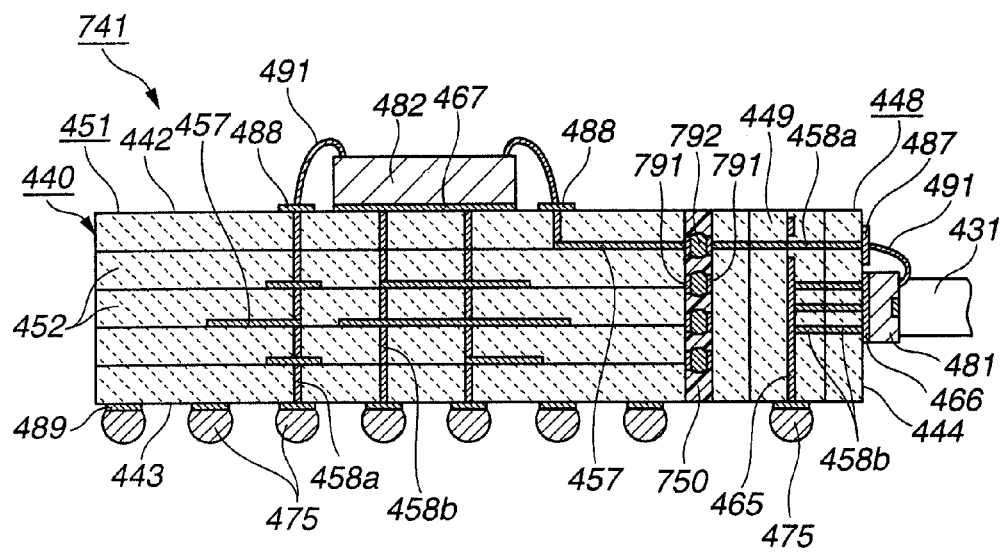
FIG. 25 is a section view of an optical module according to an eighth embodiment of the invention.
Figure 26:
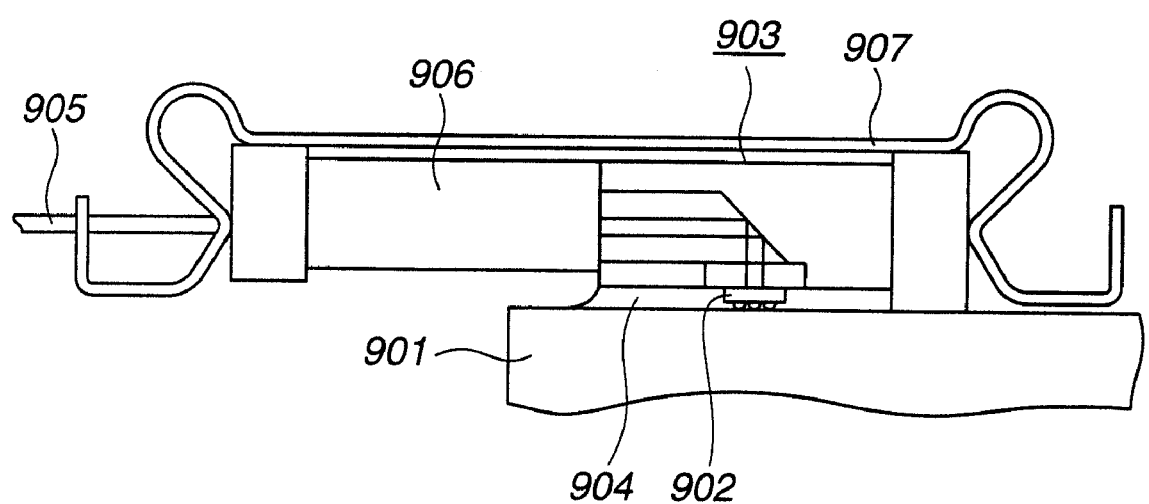
FIG. 26 is an illustration showing an optical coupling structure between an optical fiber and an optical element according to the earlier technology.

An optical module 741 of the eighth embodiment is structurally similar to the optical module 441 of the fifth embodiment, as shown in FIG. 25, except for the joint between the first and second substrate members 448 and 451. More specifically, connection pads 791 are formed on the opposed joint faces of the substrate members 448 and 451, and solder bumps 792 are provided between any opposed two connection pads 791. Further, the space between the substrate members 448 and 451 is filled with an underfill layer 750 of e.g. epoxy resin so that the underfill layer 750 functions as a heat insulation layer. The substrate members 448 and 451 can be thus mechanically connected to each other through the connection pads 791, the solder bumps 792 and the underfill layer 750 and electrically connected to each other through the connection pads 791 and the solder bumps 792. Alternatively, no underfill layer 750 can be provided. In this case, air between the first and second substrate members 448 and 451 functions as a heat insulation layer to attain improved thermal insulation efficiency although the mechanical connection between the substrate members 448 and 451 may be weakened.

Whenever the directional terms "upper", "lower", "vertical" and "lateral" have been used herein, they have been used consistent with the directions used in the "Brief Description of the Drawings" section of the present application.

The entire contents of Japanese Patent Applications No. 2004-162244 (filed on May 31, 2004) and No. 2004-248486 (filed on Aug. 27, 2004) are herein incorporated by reference.

Although the present invention has been described with reference to the above-described specific embodiments of the invention, the invention is not limited to these embodiments.

Various modification and variation of the embodiments described above will occur to those skilled in the art in light of the above teaching. The scope of the invention is defined with reference to the following claims.

What is claimed is:

1. An optical module for coupling with a fiber optic cable through an optical connector, comprising:
    a module body being connectable to a plug of the optical connector by a guide pin, with a side surface of the module body being opposed to a mating surface of the connector plug at which an end face of the fiber optic cable is exposed, the module body having a multilayer ceramic substrate as a main component, the ceramic substrate having a cavity formed in a main surface thereof and including a plurality of ceramic insulating layers and conducting layers alternately laminated together and through-hole conductors formed between the conducting layers;
    an optical element mounted to a side surface of the ceramic substrate and having an optical axis brought into alignment with an optical axis of the fiber optic cable upon fitting of the guide pin into the module body and the connector plug; and
    at least one of first and second semiconductor elements arranged in the cavity of the ceramic substrate and electrically connected to the optical element via the conductive layers and the through-hole conductors, the first semiconductor element being capable of driving the optical element, the second semiconductor element being capable of amplifying a signal from the optical element,
    the module body being so structured as to be clamped to the connector plug by a clamp spring adapted for clamping therebetween two optical connector plugs.

2. An optical module according to claim 1, wherein the optical connector is an MT connector and the clamp spring is adapted for clamping therebetween two MT connector plugs.

3. An optical module according to claim 1, wherein the ceramic substrate has a guide hole formed in the first mentioned side surface to receive therein the guide pin and a second side surface located on an opposite side of the ceramic substrate from the first mentioned side surface and held with a clamp portion of the clamp spring.

4. An optical module according to claim 1, wherein the connector plug is made of a resinous material, and the ceramic substrate has a higher thermal conductivity than that of the resinous material.

5. An optical module according to claim 1, wherein the ceramic substrate has a recess formed in the side surface thereof; and the module body including a filler having better machinability than that of the ceramic substrate body and being packed in the recess and precisely machined to define at least part of a guide hole into which the guide pin is inserted.

6. An optical module according to claim 1, wherein the side surface of the ceramic substrate defines therein at least part of a guide hole into which the guide pin is inserted.

7. An optical module according to claim 3, wherein the module body comprises a metal piece arranged in a surface of the ceramic substrate other than the opposite side surfaces of the ceramic substrate.

8. An optical module according to claim 1, wherein the module body comprises a plurality of electric terminals arranged on an opposite main surface of the ceramic substrate from the first mentioned main surface.

9. An optical module according to claim 1, wherein the ceramic substrate comprises: a first substrate member in which the ceramic insulating layers and conducting layers are alternately laminated together in a first layer lamination direction to form the side surface of the ceramic substrate with a mounting portion to which the optical element is mounted and a guide hole in which the guide pin is inserted; and a second substrate member in which the ceramic insulating layers and conducting layers are alternately laminated together in a second layer lamination direction to form the main surface of the ceramic substrate with a mounting portion to which the semiconductor element is mounted, the first and second substrate members allowing electrical connection therebetween and being joined together in such a manner that the first and second layer lamination directions are substantially perpendicular to each other.

10. An optical coupling structure, comprising:
    a fiber optic cable;
    an optical connector having a plug fixed to an end of the fiber optic cable;
    a clamp spring adapted for clamping therebetween two optical connector plugs;
    an optical module including a module body clamped to the plug of the optical connector by the clamp spring, with a side surface of the module body being opposed to a mating surface of the connector plug at which an end face of the fiber optic cable is exposed, the module body having a multilayer ceramic substrate as a main component, the ceramic substrate having a cavity formed in a main surface thereof and includind a plurality of ceramic insulating layers and conducting layers alternately laminated together and through-hole conductors formed between the conducting layers; an optical element mounted to a side surface of the ceramic substrate; and at least one of the first and second semiconductor elements arranged in the cavity of the ceramic substrate and electrically connected to the optical element via the conductive layers and the through-hole conductors, the first semiconductor element being capable of driving the optical element, the second semiconductor element being capable of amplifying a signal from the optical elements; and
    a guide pin fitted in the module body and the connector plug to bring an optical axis of the optical element into alignment with an optical axis of the fiber optic cable.

11. An optical module according to claim 2, wherein the connector plug and the clamp spring are designed in compliance with JIS C 5891.

* * * * *